(12) United States Patent
Ford et al.

(10) Patent No.: US 10,047,815 B2
(45) Date of Patent: Aug. 14, 2018

(54) RESILIENT EXPANDABLE PRESSURE VESSEL

(71) Applicant: LIQUIDSPRING TECHNOLOGIES, INC., Santa Fe Springs, CA (US)

(72) Inventors: Gary B. Ford, Santa Fe Springs, CA (US); Richard J. Meyer, Santa Fe Springs, CA (US); Peter M. Schmid, Santa Fe Springs, CA (US)

(73) Assignee: LIQUIDSPRING TECHNOLOGIES, INC., Santa Fe Springs, CA (US)

( * ) Notice: Subject to any disclaimer, the term of this patent is extended or adjusted under 35 U.S.C. 154(b) by 10 days.

(21) Appl. No.: 15/490,511

(22) Filed: Apr. 18, 2017

(65) Prior Publication Data

US 2017/0328434 A1 Nov. 16, 2017

Related U.S. Application Data

(63) Continuation of application No. 15/154,858, filed on May 13, 2016, now Pat. No. 9,670,979.

(51) Int. Cl.
*B60G 15/12* (2006.01)
*F16F 5/00* (2006.01)
(Continued)

(52) U.S. Cl.
CPC .............. *F16F 5/00* (2013.01); *B60G 15/12* (2013.01); *B60G 17/0424* (2013.01); *F15B 1/04* (2013.01);
(Continued)

(58) Field of Classification Search
CPC ...... F16C 2201/0109; F16C 2203/0604; F16F 5/00; F16F 9/084; F16F 9/19; F16F 9/064;
(Continued)

(56) References Cited

U.S. PATENT DOCUMENTS 4,478,431 A 10/1984 Muller et al.
4,798,398 A 1/1989 Cummins
(Continued)

FOREIGN PATENT DOCUMENTS

DE 102010061149 A1 6/2012
DE 102013225465 A1 4/2015
WO WO 03/080373 A2 10/2003

OTHER PUBLICATIONS

Young et al., "Roark's Formulas for Stress and Strain," Shells of Revolution; Pressure Vessels; Pipes, 7th Edition, p. 683, 2002.
(Continued)

*Primary Examiner* — Thomas W Irvin
(74) *Attorney, Agent, or Firm* — Lewis Roca Rothgerber Christie LLP

(57) ABSTRACT

A resilient expandable pressure vessel configured to function like a spring. The resilient expandable pressure vessel includes a body portion, a cavity defined within the body portion, and at least one port in communication with the cavity defined in the body portion. The at least one port is configured to receive a fluid into the cavity and discharge the fluid from the cavity. The resilient expandable pressure vessel has a predetermined expansibility across a range of operating pressures of the fluid in the cavity. The range is at least 200 psi.

21 Claims, 11 Drawing Sheets

(51) Int. Cl.
*F16F 9/19* (2006.01)
*B60G 17/04* (2006.01)
*F16F 9/06* (2006.01)
*F15B 1/04* (2006.01)
*F16F 9/084* (2006.01)
*B60G 17/033* (2006.01)

(52) U.S. Cl.
CPC ............... *F16F 9/064* (2013.01); *F16F 9/19* (2013.01); *B60G 17/033* (2013.01); *B60G 2202/152* (2013.01); *B60G 2202/242* (2013.01); *B60G 2202/30* (2013.01); *B60G 2206/42* (2013.01); *B60G 2206/422* (2013.01); *F15B 2201/22* (2013.01); *F16F 9/084* (2013.01); *F16F 2222/12* (2013.01)

(58) Field of Classification Search
CPC .............. B60G 17/033; B60G 17/0424; B60G 17/0432; B60G 17/0523; B60G 11/26; B60G 11/30; B60G 15/12
See application file for complete search history.

(56) References Cited

U.S. PATENT DOCUMENTS

| | | | |
|---|---|---|---|
| 4,982,870 A | 1/1991 | Van Loon | |
| 4,997,009 A | 3/1991 | Nukura et al. | |
| 5,036,110 A | 7/1991 | Moureaux | |
| 5,219,152 A | 6/1993 | Derrien et al. | |
| 5,456,787 A | 10/1995 | Myles | |
| 5,551,590 A | 9/1996 | Mazur et al. | |
| 5,933,209 A | 8/1999 | Sirosh et al. | |
| 5,957,252 A | 9/1999 | Berthold | |
| 5,979,692 A | 11/1999 | West | |
| 5,997,274 A | 12/1999 | Gooden | |
| 6,146,481 A | 11/2000 | Avni et al. | |
| 6,202,674 B1 | 3/2001 | Wingett | |
| 6,293,530 B1 | 9/2001 | Delorenzis et al. | |
| 6,305,673 B1 | 10/2001 | Delorenzis et al. | |
| 6,464,212 B2 * | 10/2002 | Lutz | F16F 9/092 138/30 |
| 6,486,668 B1 | 11/2002 | Murphy et al. | |
| 6,503,584 B1 * | 1/2003 | McAlister | F17C 1/02 220/560.04 |
| 6,536,722 B2 | 3/2003 | Sadowski et al. | |
| 6,565,793 B1 | 5/2003 | Goldsworthy et al. | |
| 6,679,504 B2 | 1/2004 | Delorenzis et al. | |
| 6,811,167 B2 * | 11/2004 | Coombs | B60G 7/001 280/124.154 |
| 6,988,599 B2 * | 1/2006 | Coombs | B60G 17/08 188/280 |
| 7,028,553 B2 | 4/2006 | Smith et al. | |
| 7,036,677 B1 | 5/2006 | Funck et al. | |
| 7,100,262 B2 | 9/2006 | Carter | |
| 7,108,016 B2 | 9/2006 | Moskalik et al. | |
| 7,273,209 B2 | 9/2007 | Honma | |
| 7,399,372 B2 | 7/2008 | Okada | |
| 7,416,190 B2 | 8/2008 | Sandbulte et al. | |
| 7,516,739 B2 | 4/2009 | Smith et al. | |
| 7,546,911 B2 * | 6/2009 | Honma | B60G 17/0432 188/266.2 |
| 7,607,522 B2 | 10/2009 | Nygren et al. | |
| 7,641,949 B2 | 1/2010 | DeLay et al. | |
| 7,648,042 B2 | 1/2010 | Lee et al. | |
| 7,661,442 B2 | 2/2010 | O'Brien, II et al. | |
| 7,708,125 B2 | 5/2010 | Beck | |
| 7,803,241 B2 | 9/2010 | Cundiff et al. | |
| 7,810,670 B2 | 10/2010 | Carter et al. | |
| 7,891,673 B2 | 2/2011 | Delorenzis et al. | |
| 7,984,653 B2 | 7/2011 | Oelerich et al. | |
| 7,984,731 B2 | 7/2011 | Rajabi et al. | |
| 8,047,396 B2 | 11/2011 | Jenkins et al. | |
| 8,074,826 B2 | 12/2011 | Cronin et al. | |
| 8,286,978 B2 | 10/2012 | Marabese | |
| 8,356,786 B2 | 1/2013 | Guckes | |
| 8,523,002 B2 | 9/2013 | Strack et al. | |
| 8,534,687 B2 * | 9/2013 | Coombs | B60G 17/08 188/266.2 |
| 8,627,930 B2 | 1/2014 | Smith et al. | |
| 8,800,975 B2 * | 8/2014 | Moulik | B60G 15/14 267/64.24 |
| 9,090,141 B2 | 7/2015 | Schmidt et al. | |
| 9,266,642 B2 * | 2/2016 | Prakash | B65D 13/00 |
| 9,371,879 B2 | 6/2016 | Ruan | |
| 2010/0230421 A1 | 9/2010 | Leible et al. | |
| 2011/0038450 A1 | 2/2011 | Breach et al. | |
| 2011/0138923 A1 | 6/2011 | Oelerich et al. | |
| 2011/0143222 A1 | 6/2011 | Oelerich et al. | |
| 2011/0204062 A1 | 8/2011 | Christy et al. | |
| 2011/0210128 A1 | 9/2011 | Strack et al. | |
| 2012/0267377 A1 | 10/2012 | Mueller et al. | |
| 2013/0082066 A1 | 4/2013 | Prakash et al. | |
| 2013/0087569 A1 | 4/2013 | Cutts | |
| 2013/0153583 A1 | 6/2013 | Kleschinski et al. | |
| 2013/0276961 A1 | 10/2013 | Sneddon | |
| 2015/0069071 A1 | 3/2015 | Nettis et al. | |
| 2015/0115512 A1 | 4/2015 | Ruan | |
| 2015/0159806 A1 * | 6/2015 | Nettis | F17C 1/00 220/562 |

OTHER PUBLICATIONS

International Search Report and Written Opinion for International Application No. PCT/US2017/028136, dated Aug. 7, 2017, 12 pages.

* cited by examiner

RESILIENT EXPANDABLE PRESSURE VESSEL

CROSS-REFERENCE TO RELATED APPLICATION(S)

The present application is a continuation of U.S. application Ser. No. 15/154,858, filed May 13, 2016, the entire contents of which are incorporated herein by reference.

FIELD

The present invention relates generally to resilient expandable pressure vessels used as springs and liquid spring suspension systems incorporating resilient expandable pressure vessels.

BACKGROUND

Suspension systems are commonly incorporated into structures such as buildings, bridges, and elevated highways, and machinery such as vehicles, to absorb forces and dampen vibrations which might otherwise damage the structure. These suspension systems often incorporate accumulators and one or more springs, such as coil springs (compression or extension), leaf springs, Belleville disc springs, wave springs, cantilever springs, or machined springs. Suspension systems may alternatively include a gas spring, such as an air spring. Conventional air springs typically include an air compressor connected to a bladder. The compression of the air in the bladder is configured to support the weight of the structure and to provide a spring response to loads on the structure.

Conventional suspension systems may also incorporate one or more liquid springs. Some conventional liquid spring systems include a strut connected to a pressure vessel. Some of those systems include a valve between the strut and the pressure vessel. A liquid in the strut is selectively in communication with the pressure vessel via the valve. The valve may be opened to achieve a relatively low spring rate and closed to achieve a relatively higher spring rate of the suspension system. The spring rate of conventional liquid spring systems is also a function of the compressibility of the liquid in the system. Accordingly, the liquid in conventional liquid spring systems is a compressible liquid.

Conventional pressure vessels are designed to minimize or eliminate their expansion by fabricating the pressure vessel out of rigid materials (e.g., steel or certain composites) and/or by incorporating bracketry or other structural elements designed to fix the size of the pressure vessel. Thus, conventional pressure vessels are not intended to be expandable. They are specifically designed not to be expandable, and therefore expansion would be contrary and inconsistent with their purpose.

SUMMARY

The present disclosure is directed to various embodiments of a resilient expandable pressure vessel. In one embodiment, the resilient expandable pressure vessel includes a body portion, a cavity defined within the body portion, and at least one port in communication with the cavity defined in the body portion. The at least one port is configured to receive a fluid into the cavity and discharge the fluid from the cavity. The resilient expandable pressure vessel has a predetermined expansibility across a range of operating pressures of the fluid in the cavity. The range of operating pressures, over which the resilient expandable pressure vessel has a predetermined expansibility, is at least 200 psi. The resilient expandable pressure vessel may have an expansion greater than approximately 0.1% when an operating pressure of the fluid in the cavity is approximately 500 psi. The resilient expandable pressure vessel may have an expansion less than approximately 200% when an operating pressure of the fluid in the cavity is greater than approximately 5000 psi. The predetermined expansibility of the resilient expandable pressure vessel may vary across the range of operating pressures of the fluid in the cavity.

The present disclosure is also directed to various embodiments of an accumulator incorporating the resilient expandable pressure vessel according to one or more embodiments of the present disclosure.

The present disclosure is also directed to various embodiments of a suspension system. In one embodiment, the suspension system includes a cylinder defining a chamber, at least a piston or a rod reciprocally movable within the chamber, a resilient expandable pressure vessel defining a cavity in communication with the chamber, and a fluid contained within the chamber and the cavity. The resilient expandable pressure vessel has a predetermined expansibility across a range of operating pressures of the fluid in the suspension system. The range of operating pressures, over which the resilient expandable pressure vessel has a predetermined expansibility, is at least 200 psi. The resilient expandable pressure vessel may have an expansion greater than approximately 0.1% when an operating pressure of the fluid in the cavity is approximately 500 psi. The resilient expandable pressure vessel may have an expansion less than approximately 200% when an operating pressure of the fluid in the cavity is greater than approximately 5000 psi. The fluid may be a liquid. The liquid may be a compressible liquid or a non-compressible liquid.

In one or more embodiments, the resilient expandable pressure vessel may surround the cylinder. The cylinder may define at least one orifice placing the chamber directly in communication with the cavity. The suspension system may include a manifold and valve assembly coupled to the cylinder. The manifold and valve assembly is selectively operable between an open position in which the chamber is in communication with the cavity and a closed position in which the chamber is isolated from the cavity. In one or more embodiments, the resilient expandable pressure vessel may be separated from the cylinder. The suspension system may include a valve located between the chamber and the resilient expandable pressure vessel. The valve is selectively operable between an open position in which the chamber is in communication with the cavity and a closed position in which the chamber is isolated from the cavity.

The suspension system may include a second resilient expandable pressure vessel defining a second cavity in communication with the chamber. The suspension system may also include a valve located between the chamber and the second resilient expandable pressure vessel. The valve is selectively operable between an open position in which the chamber is in communication with the second cavity and a closed position in which the chamber is isolated from the second cavity. The predetermined expansibility of the resilient expandable pressure vessel may vary across the range of operating pressures of the fluid in the cavity. The predetermined expansibility of the resilient expandable pressure vessel may include a first region having a first rate of expansion and a second region having a second rate of expansion less than the first rate of expansion. A transition point between the first region and the second region may occur before the piston and/or the rod reaches a fully compressed position in the cylinder such that the resilient expandable pressure vessel functions as a jounce bumper.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
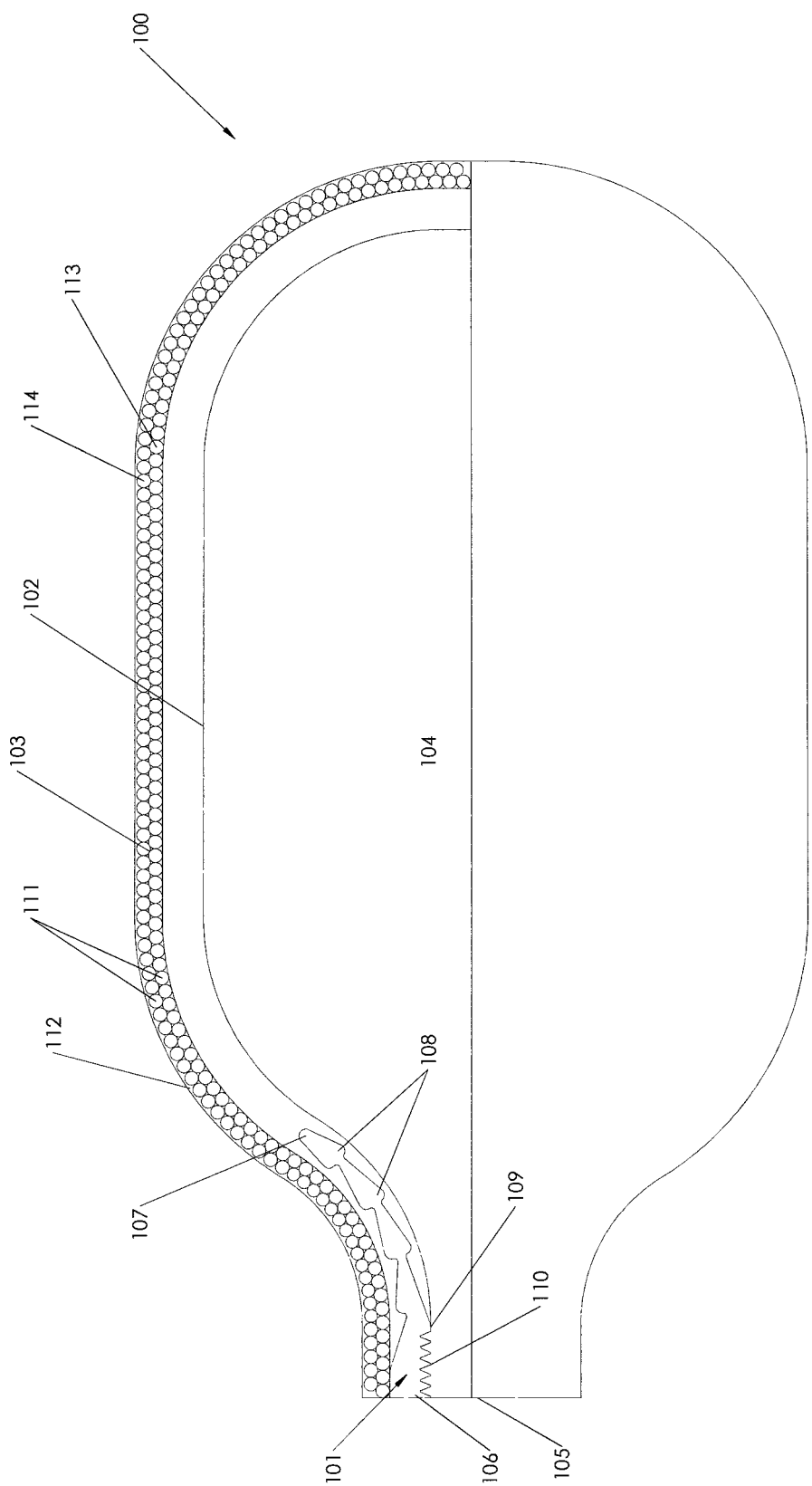
FIG. 1 is a partial cross-sectional side view of a resilient expandable pressure vessel according to one embodiment of the present disclosure.

The present disclosure is directed to various embodiments of a resilient expandable pressure vessel used as a spring. As the pressure of a fluid (e.g., a liquid or a gas) in the resilient expandable pressure vessel increases, the vessel expands. This increase in pressure can be a result of more fluid being introduced into the vessel via a pump, or due to the fluid being heated, or through a chemical reaction, or by any other means. The vessel contracts when a volume of the fluid exits the vessel or the pressure of the fluid decreases through some other means. When the pressure supplied by the fluid drops below a predetermined threshold value, the resilient expandable pressure vessel is configured to return to its original unexpanded position. In this manner, the resilient expandable pressure vessel is configured to function as a spring (i.e., the energy stored in the expanded pressure vessel supplies a spring-like restorative force).

The present disclosure is also directed to various embodiments of a suspension system incorporating a resilient expandable pressure vessel. Unlike conventional liquid spring suspension systems in which the spring rate of the system is primarily dependent on the pressure, volume, and compressibility of the liquid in the system, the spring rate of the suspension systems of the present disclosure is a function of the expansibility of the resilient expandable pressure vessel in conjunction with the pressure, volume, and compressibility of the liquid in the system. Accordingly, unlike a conventional liquid spring suspension system in which the non-expandable pressure vessel must be relatively large to achieve suitably low spring rates, the expansibility of the resilient expandable pressure vessel enables the liquid spring suspension systems of the present disclosure to achieve the same suitably low spring rates in a smaller, more compact design. Thus, the resilient expandable pressure vessel is configured to reduce the size of the liquid spring suspension systems of the present disclosure compared to conventional liquid spring suspension systems that incorporate a non-expandable pressure vessel. Additionally, to be suitable for use in various systems, a spring must have a known spring rate that can be anticipated in operation. That is, the spring must operate in a predicable way. In embodiments of the present disclosure, at least a portion of the spring rate of the liquid spring suspension system is derived from the predetermined and predictable expansibility of a resilient expandable pressure vessel.

As used herein, the terms "fluid", "in communication", and "isolated" are used to describe various concepts and relationships of the invention. The word "fluid" refers to the substance contained within the components, for example, a liquid or a gas. The words "in communication" mean that the fluid is allowed to flow between the relevant components. The word "isolated" means the fluid is prevented from flowing between the relevant components. Liquids used in the resilient expandable pressure vessels may be compressible or non-compressible. As used herein, the term "non-compressible liquid" refers to a liquid having a compression of less than approximately 2.0% at approximately 4000 psi. Additionally, as used herein, the term "predetermined expansibility" refers to the sufficiently controlled and repeatable rate or rates of volumetric expansion of the resilient expandable pressure vessel over a range of operating pressures that enables the resilient expandable pressure vessel to function as a spring and exhibit one or more desired and generally predictable spring rates.

With reference now to FIG. 1, a resilient expandable pressure vessel 100 according to one embodiment of the present disclosure includes a polar boss 101, an inner liner 102 coupled to the polar boss 101, and an outer layer 103 surrounding the polar boss 101 and the inner liner 102. Together, the inner liner 102 and the outer layer 103 define a body portion of the resilient expandable pressure vessel 100. Together, the polar boss 101, the inner liner 102, and the outer layer 103 define an inner cavity 104 and a port 105

(e.g., a hydraulic or pneumatic port) in communication with the inner cavity 104. In one or more alternate embodiments, the resilient expandable pressure vessel 100 may be provided without the inner liner 102.

In the illustrated embodiment, the polar boss 101 flares between a relatively narrower outer end 106 and a relatively larger inner end 107, although in one or more alternate embodiments the polar boss 101 may have any other suitable shape, such as, for instance, cylindrical, and still fall within the scope and spirit of the present disclosure. The larger inner end 107 of the polar boss 101 may include a plurality of ribs or teeth 108 configured to engage a portion of the inner liner 102 and thereby increase the attachment strength between the polar boss 101, the inner liner 102, and the outer layer 103. In one or more alternate embodiments, the polar boss 101 may not include the teeth 108 and the polar boss 101 may include any other suitable mechanism for increasing the attachment strength between the polar boss 101, the inner liner 102, and the outer layer 103. An inner surface 109 of the polar boss 101 proximate to the narrower outer end 106 of the polar boss 101 also includes internal threads 110 to facilitate attachment of a conduit, such as, for instance, a hose, a tube, a pipe, a nozzle, or a valve, to the polar boss 101. In one or more alternate embodiments, the polar boss 101 may be provided without the threads 110 and the conduit may be coupled to the polar boss 101 by any other suitable means, such as, for instance, with a press-fit (i.e., interference fit) connection, a flange fitting, or by welding or bonding. The conduit is configured to selectively deliver and/or remove a fluid (e.g., a gas or a liquid) into the inner cavity 104 of the resilient expandable pressure vessel 100 through the port 105. The polar boss 101 may be made from any suitably durable material, such as, for instance, metal (e.g., stainless steel) or metal alloy. The inner liner 102 may be made out of any suitable expansive and resilient material, such as, for instance, plastic. Additionally, although the resilient expandable pressure vessel 100 in the illustrated embodiment includes a single port 105 and a single polar boss 101, in one or more alternate embodiments, the resilient expandable pressure vessel 100 may include one or more additional ports 105 and corresponding polar bosses 101. For instance, in one embodiment, the resilient expandable pressure vessel 100 may include a pair of polar bosses 101 and a pair of corresponding ports 105 disposed on opposite ends of the resilient expandable pressure vessel 100.

With continued reference to the embodiment illustrated in FIG. 1, in one embodiment the outer layer 103 comprises a plurality of unidirectionally oriented fibers 111 impregnated with any suitable type of matrix material 112, such as, for instance, epoxy resin. The fibers 111 of the outer layer 103 may be made out of any suitable material, such as, for instance, carbon, glass, or plastic (e.g., nylon). Additionally, although in the illustrated embodiment the outer layer 103 includes two layers 113, 114 of resin-impregnated fibers 111 (i.e., two complete windings of the resin-impregnated fibers 111), in one or more alternate embodiments, the outer layer 103 may include any other suitable number of layers of resin-impregnated fibers 111, such as, for instance, from one to six layers, depending on the desired durability and predetermined expansibility of the resilient expandable pressure vessel 100. Additionally, although the fibers 111 in the illustrated embodiment are unidirectionally oriented, in one or more alternate embodiments, the fibers 111 may be oriented in two or more different directions. The outer layer 103 of the resilient expandable pressure vessel 100 may be formed by any suitable process, such as, for instance, by conventional filament winding techniques. Suitable methods for manufacturing composite overwrapped pressure vessels are disclosed in U.S. Pat. No. 7,641,949, the entire content of which is hereby incorporated by reference. In one or more alternate embodiments, the outer layer 103 of the resilient expandable pressure vessel 100 may have any other desired configuration and may be made out of any other materials suitable for achieving the durability and predetermined expansibility of the resilient expandable pressure vessel 100.

In the illustrated embodiment, the inner liner 102 loosely contacts the outer layer 103 when the resilient expandable pressure vessel 100 is in an unexpanded/neutral state (i.e., before a fluid (e.g., a liquid or a gas) has been introduced into the inner cavity 104 that exerts a pressure on the inner liner 102). In one or more alternate embodiments, the inner liner 102 may firmly contact or may not contact the outer layer 103 when the resilient expandable pressure vessel 100 is in the unexpanded position. As fluid is introduced into the inner cavity 104 of the resilient expandable pressure vessel 100 through the port 105 by an external force, such as, for instance, a pump, an accumulator, or a strut, the fluid will exert a force on the inner liner 102 causing it to elastically expand and press against the outer layer 103. Alternatively, the pressure of the fluid can be increased by the addition of heat, or via a chemical reaction, or by other means such that the fluid will exert a force on the inner liner 102 causing it to elastically expand and press against the outer layer 103. If the pressure of the fluid in the inner cavity 104 exceeds a predetermined threshold pressure, which is dependent upon the material and physical properties of the inner liner 102 and the outer layer 103, the inner liner 102 will continue to expand such that the inner liner 102 forces the outer layer 103 to elastically expand. The expansibility of the resilient expandable pressure vessel 100 decreases the pressure of the fluid in the inner cavity 104. Accordingly, the resilient expandable pressure vessel 100 will continue to elastically expand, thereby decreasing the pressure of the fluid in the cavity 104, until an equilibrium point is reached between the force of the fluid acting on the resilient expandable pressure vessel 100 and the elastic restorative force of the resilient expandable pressure vessel 100 acting on the fluid in the inner cavity 104. Once the external force introducing the fluid into the cavity 104 is removed or decreased (or the pressure is removed or decreased via other means), the outer layer 103 and the inner liner 102 will contract until the force applied by the fluid in the cavity 104 to the resilient expandable pressure vessel 100 is balanced by the force applied by the resilient expandable pressure vessel 100 to the fluid. In this manner, the resilient expandable pressure vessel 100 of the present disclosure functions as a spring. In an embodiment in which the resilient expandable pressure vessel 100 is provided without the inner liner 102, the material and physical properties of the outer layer 103 alone may determine the expansibility and the elastic restorative force of the resilient expandable pressure vessel 100.

Figure 2:
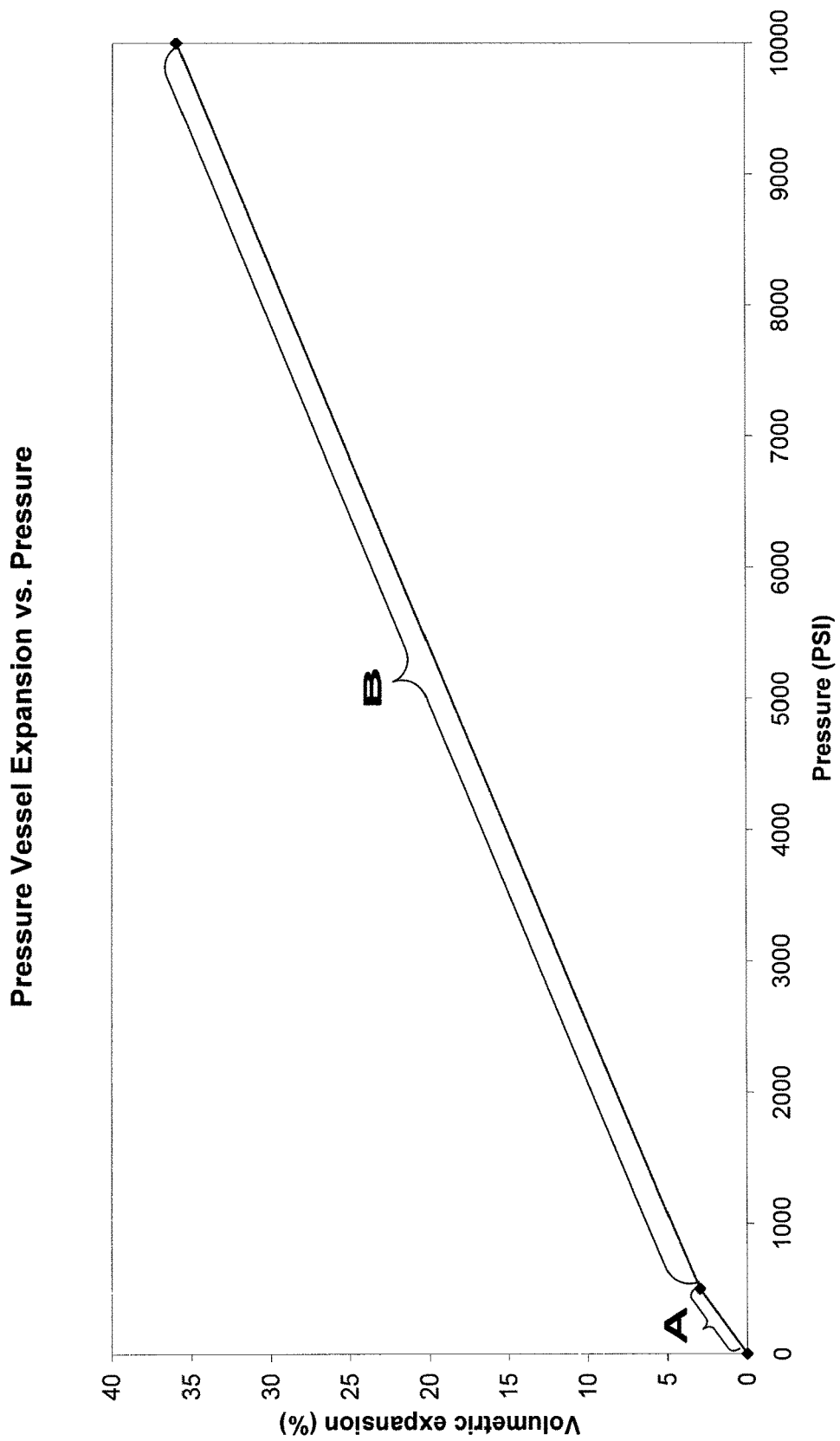
FIG. 2 is a graph illustrating the volumetric expansion of the resilient expandable pressure vessel of FIG. 1 when subject to a range of different internal pressures.

FIG. 2 is a graph illustrating the percentage of volumetric expansion of one embodiment of the resilient expandable pressure vessel 100 illustrated in FIG. 1 for a range of different pressures of the fluid (e.g., a gas or a liquid) in the inner cavity 104. The amount of expansion of the resilient expandable pressure vessel 100 is defined by the percentage difference between the volume of the inner cavity 104 when the resilient expandable pressure vessel 100 is in an elastically predetermined expanded state and the volume of the inner cavity 104 when the resilient expandable pressure vessel 100 is in a neutral or unexpanded state. Region A in FIG. 2 indicates a lower pressure region where the inner liner 102 is elastically expanding under the pressure of the fluid in the cavity 104, but the outer layer 103 is not yet expanding (e.g., the inner liner 102 in the unexpanded position loosely contacts the outer layer 103 and the inner liner 102 has not yet expanded sufficiently to fully contact the outer layer 103). Region B in FIG. 2 indicates a higher pressure region where the inner liner 102 is fully pressed against the outer layer 103 and both the inner liner 102 and the outer layer 103 are elastically expanding under the pressure of the fluid in the cavity 104. In the illustrated embodiment, in region A, the volumetric expansion of the resilient expandable pressure vessel 100 increases from 0% at 0 psi to approximately 3% at approximately 500 psi. In one or more alternate embodiments, the resilient expandable pressure vessel 100 may have any other predetermined amount of expansion depending on the material and physical properties of the inner liner 102. In region B, the volumetric expansion of the resilient expandable pressure vessel 100 increases from approximately 3% at approximately 500 psi to approximately 35% at approximately 10,000 psi. In one or more alternate embodiment, the resilient expandable pressure vessel 100 may have any other predetermined amount of expansion depending on the material and physical properties of the inner layer 102 and the outer layer 103. Accordingly, in the illustrated embodiment, the resilient expandable pressure vessel 100 has an expansion of approximately 4.6% at approximately 1000 psi, an expansion of approximately 8.1% at approximately 2000 psi, an expansion of approximately 11.4% at approximately 3000 psi, an expansion of approximately 14.8% at approximately 4000 psi, an expansion of approximately 18.2% at approximately 5000 psi, an expansion of approximately 21.6% at approximately 6000 psi, an expansion of approximately 24.9% at approximately 7000 psi, an expansion of approximately 28.3% at approximately 8000 psi, and an expansion of approximately 31.6% at approximately 9000 psi. As illustrated in FIG. 2, the rate of change of expansion (i.e., the expansivity) of the combined inner liner 102 and the outer layer 103 (i.e., the slope of the line in region B) is less than the rate of change of the expansion of the inner liner alone 102 (i.e., the slope of the line in region A) due to the increased resistance to expansion provided by the outer layer 103. Accordingly, as illustrated in FIG. 2, the resilient expandable pressure vessel 100 has a predetermined expansibility across a range of operating pressures of the fluid in the cavity 104. In one or more embodiments, the range of operating pressures over which the resilient expandable pressure vessel 100 has a predetermined expansibility may be approximately 200 psi or greater, such as, for example, at least approximately 500 psi, at least approximately 1000 psi, or at least approximately 2000 psi or more.

Although in the embodiment illustrated in FIG. 2 the transition point between region A and region B is approximately 500 psi, in one or more alternate embodiments, the transition point may be any other predetermined pressure point depending on the material and physical properties of the inner liner 102 and the degree or amount of contact between the inner liner 102 and the outer layer 103 in the unexpanded neutral position. Additionally, in one or more alternate embodiments in which the resilient expandable pressure vessel 100 does not include the inner liner 102, the expansivity of the resilient expandable pressure vessel 100 may not include a transition point between regions A and B because the expansivity of the resilient expandable pressure vessel 100 would be a function solely of the properties of the outer layer 103. The resilient expandable pressure vessel 100 may also not include a transition point between two different regions or rates of expansion when the inner liner 102 in the unexpanded position fully contacts the outer layer 103 (e.g., the resilient expandable pressure vessel 100 may include a single rate of expansion when the inner liner 102 in the unexpanded position fully contacts or abuts against the outer layer 103). Additionally, although in FIG. 2 the expansion of the resilient expandable pressure vessel 100 in regions A and B is depicted as varying linearly or substantially linearly with pressure, in one or more alternate embodiments, the expansion of the resilient expandable pressure vessel 100 may not vary linearly depending on the properties of the inner liner 102 and the outer layer 103 (e.g., the volumetric expansion of the resilient expandable pressure vessel 100 in region A and/or region B may vary exponentially or logarithmically with pressure).

Additionally, the expansion of the resilient expandable pressure vessel 100 is not limited to the values depicted in FIG. 2. Instead, in one or more alternate embodiments, the volumetric expansion of the resilient expandable pressure vessel 100 may vary depending upon a variety of factors, including the presence or absence of the inner liner 102, the material and thickness of the inner liner 102, the material and thickness of the outer layer 103 (e.g., the orientation of the resin-impregnated fibers 111 in the outer layer 103 and the number of layers 113, 114 of fibers 111 in the outer layer 103), and the overall size of the resilient expandable pressure vessel 100. For instance, in one or more alternate embodiments, the resilient expandable pressure vessel 100 may have any predetermined amount of expansion when the operating pressure of the fluid in the cavity 104 is between approximately 500 psi and approximately 10,000 psi, such as, for instance, between approximately 0.1% and approximately 100%, between approximately 0.3% and approximately 100%, between approximately 0.6% and approximately 100%, between approximately 1% and approximately 100%, or between approximately 3% and approximately 100%. In other embodiments, the resilient expandable pressure vessel 100 may have any predetermined amount of expansion between approximately 0.6% and approximately 100% when the operating pressure of the fluid in the cavity 104 is between approximately 1000 psi and approximately 6000 psi. In one embodiment, the resilient expandable pressure vessel 100 may have an expansion of approximately 16% when the operating pressure of the fluid in the cavity 104 is approximately 4000 psi. In one embodiment, the resilient expandable pressure vessel 100 may have an expansion greater approximately 0.1% when the operating pressure of the fluid in the cavity 104 is approximately 500 psi. In one embodiment, the resilient expandable pressure vessel 100 may have an expansion greater than approximately 0.3% when the operating pressure of the fluid in the cavity 104 is approximately 500 psi. In one embodiment, the resilient expandable pressure vessel 100 may have an expansion less than approximately 100% when the operating pressure of the fluid in the cavity 104 is greater than approximately 5000 psi. In one embodiment, the resilient expandable pressure vessel 100 may have an expansion less than approximately 200% when the operating pressure of the fluid in the cavity 104 is greater than approximately 5000 psi.

Figure 3:
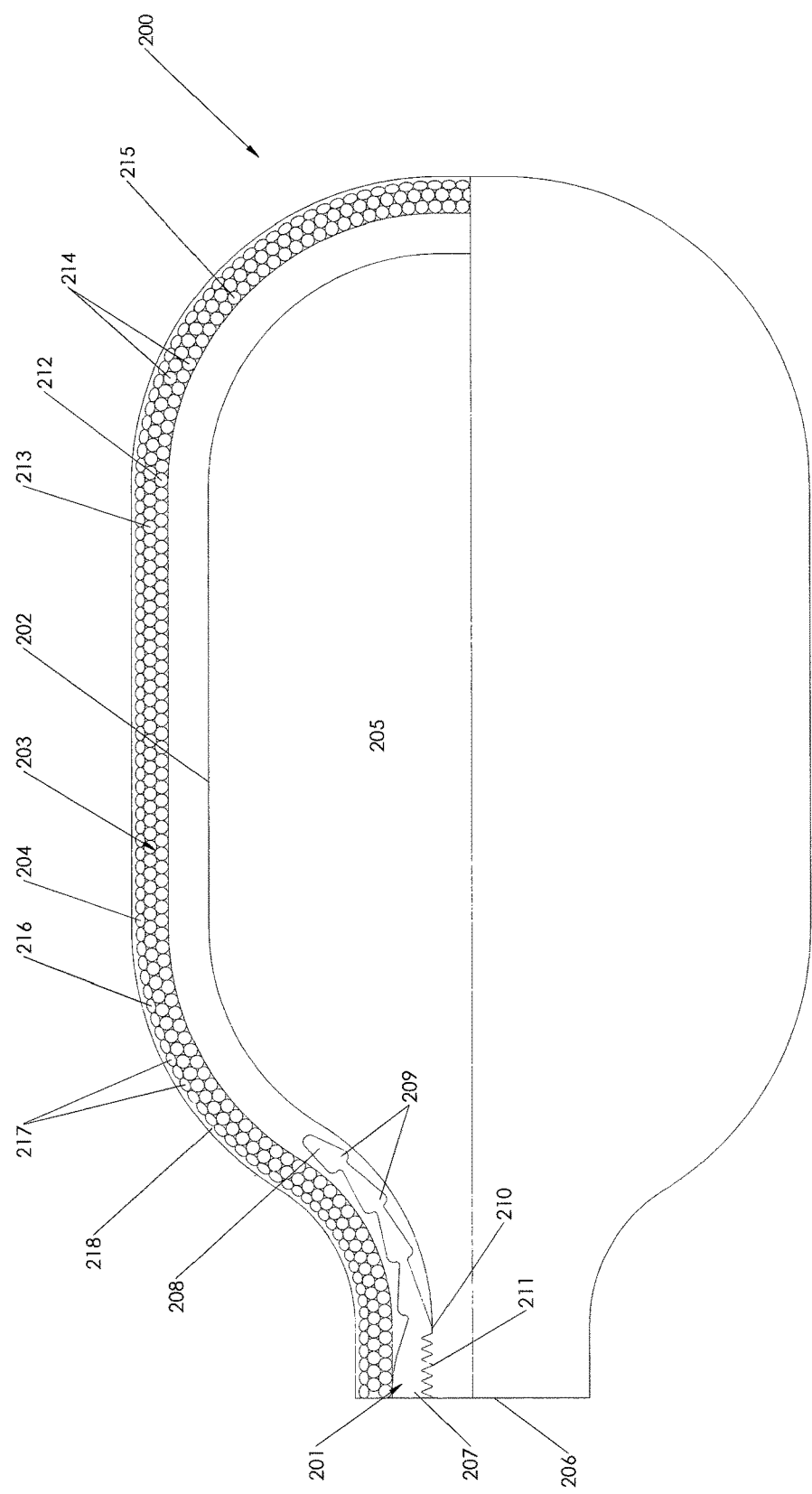
FIG. 3 is a partial cross-sectional side view of a resilient expandable pressure vessel according to another embodiment of the present disclosure.

With reference now to FIG. 3, a resilient expandable pressure vessel 200 according to another embodiment of the present disclosure includes a polar boss 201, an inner liner 202 coupled to the polar boss 201, an intermediate layer 203 surrounding the polar boss 201 and the inner liner 202, and an outer layer 204 surrounding the intermediate layer 203. Together, the inner liner 202, the intermediate layer 203, and the outer layer 204 define a body portion of the resilient expandable pressure vessel 200. Together, the polar boss 201, the inner liner 202, the intermediate layer 203, and the outer layer 204 define an inner cavity 205 and a port 206 in communication with the inner cavity 205. In one or more alternate embodiments, the resilient expandable pressure vessel 200 may not include the inner liner 202.

In the illustrated embodiment, the polar boss 201 flares between a relatively narrower outer end 207 and a relatively larger inner end 208, although the polar boss 201 may have any other suitable shape, such as, for instance, cylindrical, and still fall within the scope and spirit of the present disclosure. The larger inner end 208 of the polar boss 201 includes a plurality of ribs or teeth 209 configured to engage a portion of the inner liner 202 and the intermediate layer 203 and thereby increase the attachment strength between the polar boss 201, the inner liner 202, and the intermediate layer 203. In one or more alternate embodiments, the polar boss 201 may not include the teeth 209 and the polar boss 201 may include any other suitable mechanism for increasing the attachment strength between the polar boss 201, the inner liner 202, and the intermediate layer 203. An inner surface 210 of the polar boss 201 proximate to the narrower outer end 207 of the polar boss 201 also includes internal threads 211 to facilitate the attachment of a conduit, such as, for instance, a hose, a tube, a pipe, a nozzle, or a valve, to the polar boss 201. In one or more alternate embodiments, the polar boss 201 may be provided without the threads 211 and the conduit may be coupled to the polar boss 201 by any other suitable means, such as, for instance, with a press-fit (i.e., interference fit) connection, a flange fitting, or by welding or bonding. The conduit is configured to selectively deliver and/or remove a fluid (e.g., a gas or a liquid) into the inner cavity 205 of the resilient expandable pressure vessel 200 through the port 206. In one embodiment, the polar boss 201 may be the same or similar to polar boss 101 described above with reference to FIG. 1. Additionally, although the resilient expandable pressure vessel 200 in the illustrated embodiment includes a single port 206 and a single corresponding polar boss 201, in one or more alternate embodiments, the resilient expandable pressure vessel 200 may include one or more additional ports 206 and polar bosses 201, such as, for instance, a pair of polar bosses 201 and a pair of corresponding ports 206 disposed on opposite ends of the resilient expandable pressure vessel 200.

With continued reference to the embodiment illustrated in FIG. 3, the intermediate layer 203 comprises two layers 212, 213 of unidirectionally oriented fibers 214 impregnated with a matrix material 215, such as, for instance, epoxy resin. The fibers 214 of the intermediate layer 203 may be made out of any suitable material, such as, for instance, carbon, glass, or plastic (e.g., nylon). In one or more alternate embodiments, the intermediate layer 203 may include any other suitable number of layers of resin-impregnated fibers 214, such as, for instance, from one to six layers, depending on the desired durability and predetermined expansibility of the resilient expandable pressure vessel 200. In one embodiment, the intermediate layer 203 may be the same or similar to the outer layer 103 described above with reference to FIG. 1.

In the embodiment illustrated in FIG. 3, the outer layer 204 comprises a single layer 216 of unidirectionally oriented fibers 217 impregnated with a matrix material 218, such as, for instance, epoxy resin, although in one or more alternate embodiments, the outer layer 204 may have any other suitable number of layers of resin-impregnated fibers 217, such as, for instance, from one to six layers. Additionally, in the illustrated embodiment, the fibers 217 in the outer layer 204 are oriented in a different direction than the fibers 214 in the intermediate layer 203. Any suitable angle may be defined between the orientation of the fibers 214 in the intermediate layer 203 and the fibers 217 in the outer layer 204, such as, for instance, an angle from approximately 15 degrees to approximately 90 degrees, depending upon the desired durability and predetermined expansibility of the resilient expandable pressure vessel 200. The intermediate layer 203 and the outer layer 204 may be formed by any suitable process, such as, for instance, by the conventional wrapping or winding techniques disclosed in U.S. Pat. No. 7,641,949. In one or more alternate embodiments, the intermediate layer 203 and the outer layer 204 of the resilient expandable pressure vessel 200 may have any other desired configurations and may be made out of any other materials suitable for achieving the desired durability and predetermined expansibility of the resilient expandable pressure vessel 200. For instance, in one embodiment, the fibers 217 in the outer layer 204 and the fibers 214 in the intermediate layer 203 may have the same or substantially the same orientation and/or may be made out of dissimilar materials (e.g., the fibers 217 in the outer layer 204 may be made out of glass and the fibers 214 in the intermediate layer 203 may be made out of nylon). Additionally, in one or more embodiments, the fibers 217 in the outer layer 204 may be impregnated with a different type of resin than the fibers 214 in the intermediate layer 203.

As fluid (e.g., a gas or a liquid) is introduced into the inner cavity 205 of the resilient expandable pressure vessel 200 through the port 206 by an external force, such as, for instance, a pump, an accumulator, or a strut, the fluid will exert a force on the inner liner 202 causing it to elastically expand and press against the intermediate layer 203. Alternatively, the pressure of the fluid can be increased by the addition of heat, or via a chemical reaction, or by other means such that the fluid will exert a force on the inner liner 202 causing it to elastically expand and press against the outer layer 203. If the pressure of the fluid in the inner cavity 205 exceeds a threshold pressure, which is dependent upon the material and physical properties of the inner liner 202 and the intermediate layer 203, the inner liner 202 will continue to expand such that the inner liner 202 forces the intermediate layer 203 to elastically expand. Additionally, if the pressure of the fluid in the inner cavity 205 exceeds a greater threshold pressure, which is dependent upon the material and physical properties of the inner liner 202, the intermediate layer 203, and the outer layer 204, the inner liner 202 and the intermediate layer 203 will continue to expand and thereby cause the outer layer 204 to elastically expand. The elastic expansion of the resilient expandable pressure vessel 200 decreases the pressure of the fluid in the inner cavity 205. Accordingly, the resilient expandable pressure vessel 200 will continue to elastically expand until an equilibrium point is reached between the force of the fluid acting on the resilient expandable pressure vessel 200 and the elastic restorative force of the resilient expandable pressure vessel 200 acting on the fluid in the inner cavity 205. Once the external force introducing the fluid into the cavity 205 is removed or decreased (or the pressure is removed or reduced via other means), the outer layer 204, the intermediate layer 203, and the inner liner 202 will contract until the force applied by the fluid in the cavity 205 to the resilient expandable pressure vessel 200 is balanced by the force applied by the resilient expandable pressure vessel 200 to the fluid. In this manner, the resilient expandable pressure vessel 200 of the present disclosure functions as a variable rate spring. In an embodiment in which the resilient expandable pressure vessel 200 is provided without the inner liner 202, the material and physical properties of the intermediate and outer layers 203, 204 alone may determine the expansion, expansibility, and the elastic restorative force of the resilient expandable pressure vessel 200.

Figure 4:
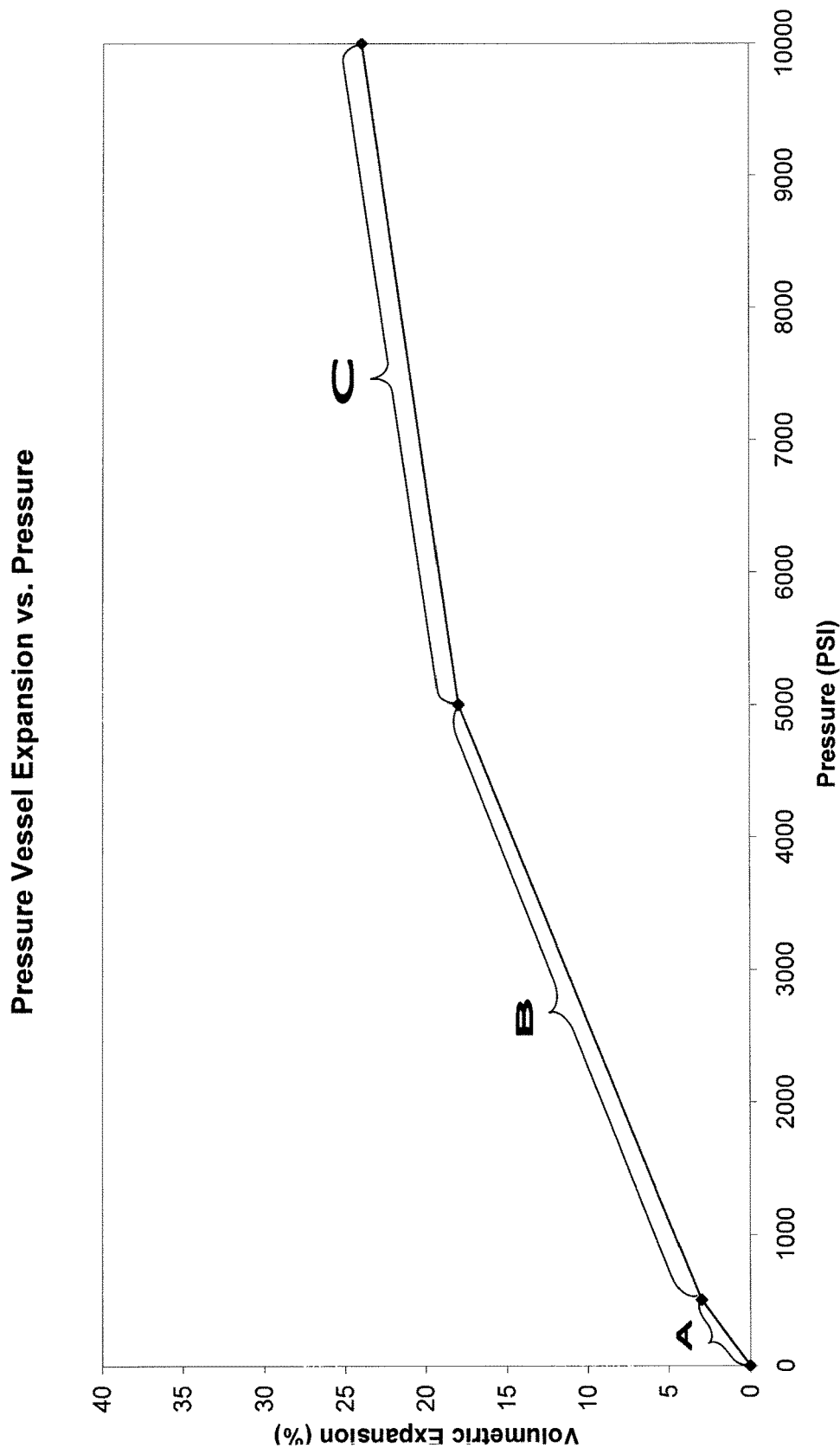
FIG. 4 is a graph illustrating the volumetric expansion of the resilient expandable pressure vessel of FIG. 3 when subject to a range of different internal pressures.

FIG. 4 is a graph illustrating the percentage of volumetric expansion (i.e., the amount of expansion) of one embodiment of the resilient expandable pressure vessel 200 illustrated in FIG. 3 for a range of different pressures of the fluid (e.g., a gas or a liquid) in the inner cavity 205. Region A in FIG. 4 indicates a lower pressure region where the inner liner 202 is elastically expanding under the pressure of the fluid in the cavity 205, but the intermediate layer 203 and the outer layer 204 are not yet expanding (e.g., the inner liner 202 in the unexpanded position loosely contacts the intermediate layer 203 and the inner liner 202 has not yet expanded sufficiently to fully contact the intermediate layer 203). Region B in FIG. 4 indicates a medium pressure region where the inner liner 202 is fully pressed against the intermediate layer 203 and both the inner liner 202 and the intermediate layer 203 are elastically expanding under the pressure of the fluid in the cavity 205. Region C in FIG. 4 indicates a higher pressure region where the inner liner 202 and the intermediate layer 203 are pressed against the outer layer 204 such that the inner liner 202, the intermediate layer 203, and the outer layer 204 are all elastically expanding under the pressure of the fluid in the cavity 205. In region A, the volumetric expansion of the expandable pressure vessel 200 increases from 0% at 0 psi to approximately 3% at approximately 500 psi. In region B, the volumetric expansion of the resilient expandable pressure vessel 200 increases from approximately 3% at approximately 500 psi to approximately 18% at approximately 5000 psi. In region C, the volumetric expansion of the resilient expandable pressure vessel 200 increases from approximately 18% at 5000 psi to approximately 22% at approximately 10,000 psi. As illustrated in FIG. 4, the rate of change of expansion (i.e., the expansivity) of the combined inner liner 202 and the intermediate layer 203 (i.e., the slope of the line in region B) is less than the rate of change of the expansion of the inner liner 202 alone (i.e., the slope of the line in region A) due to the increased resistance to expansion provided by the intermediate layer 203. Similarly, the rate of change of expansion of the combined inner liner 202, the intermediate layer 203, and the outer layer 204 (i.e., the slope of the line in region C) is less than the rate of change of the expansion of the combined inner liner 202 and the intermediate layer 203 (i.e., the slope of the line in region B) due to the increased resistance to expansion provided by the outer layer 204. Accordingly, as illustrated in FIG. 4, the resilient expandable pressure vessel 200 has a predetermined expansibility across a range of operating pressures of the fluid in the cavity 205. In one or more embodiments, the range of operating pressures over which the resilient expandable pressure vessel 200 has a predetermined expansibility may be approximately 200 psi or greater, such as, for example, at least approximately 500 psi, at least approximately 1000 psi, or at least approximately 2000 psi or more.

Although in the embodiment illustrated in FIG. 4 the transition point between region A and region B is approximately 500 psi and the transition point between region B and region C is approximately 5000 psi, in one or more alternate embodiments, the transition points may be at any other predetermined pressure points. The expansion of the resilient expandable pressure vessel 200 may also vary in any manner described above with reference to the expansion of the resilient expandable pressure vessel 100 shown in FIG. 2 (e.g., the expansion of the resilient expandable pressure vessel 200 may include fewer than two transition pressure points, including no transition pressure points, and/or the expansion of the resilient expandable pressure vessel 200 may be non-linear, such as exponential or logarithmic).

The expansion of the resilient expandable pressure vessel 200 is not limited to the values depicted in FIG. 4. Instead, in one or more alternate embodiments, the volumetric expansion of the resilient expandable pressure vessel 200 may vary depending upon a variety of factors, including the presence or absence of the inner liner 202, the material and thickness of the inner liner 202, the material and thickness of the intermediate layer 203 (e.g., the orientation of the resin-impregnated fibers 214 and the number of layers 212, 213 of fibers 214 in the intermediate layer 203), the material and thickness of the outer layer 204 (e.g., the orientation of the resin-impregnated fibers 217 and the number of layers 216 of fibers 217 in the outer layer 204), and the overall size of the resilient expandable pressure vessel 200.

Figure 5:
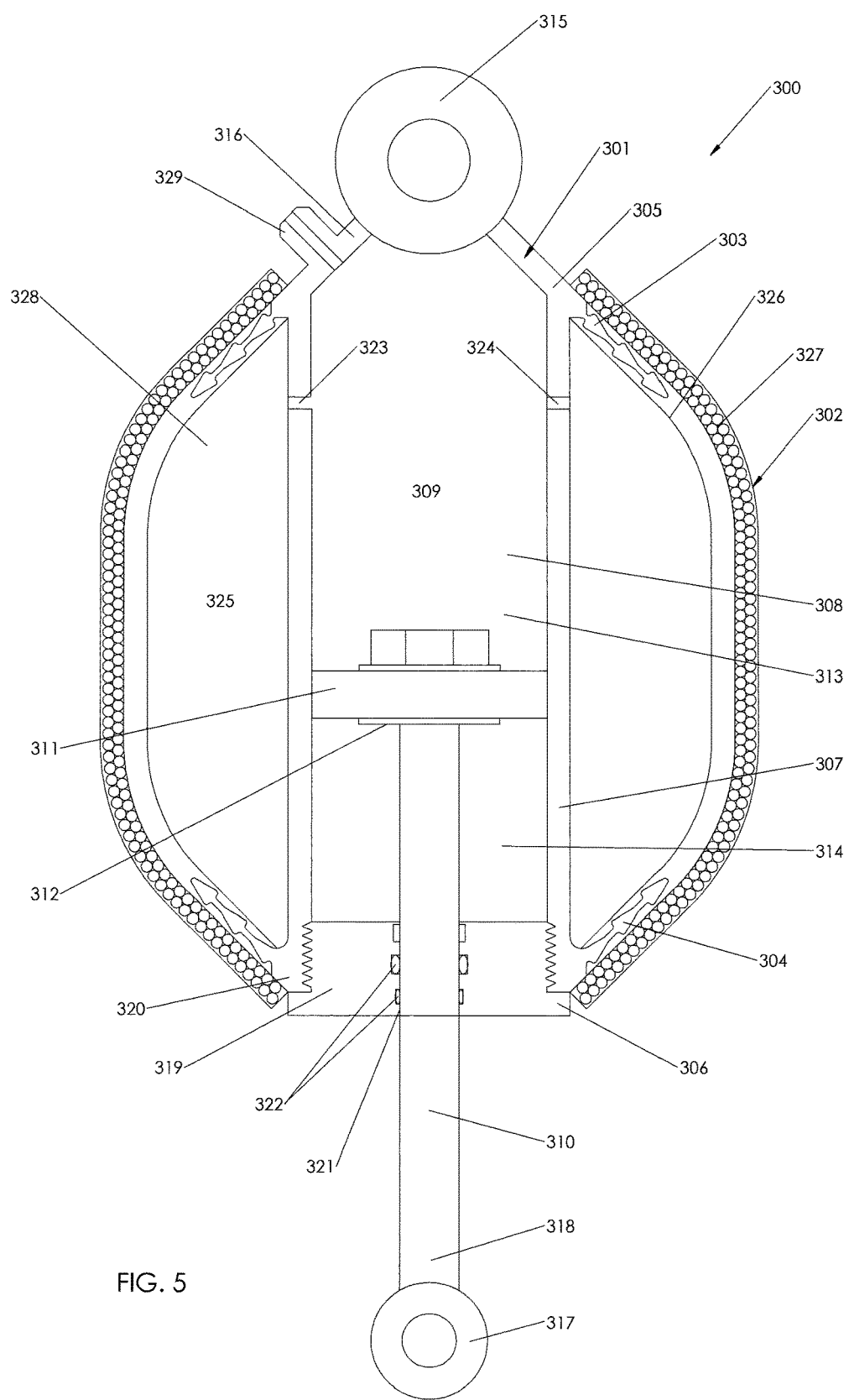
FIG. 5 is a cross-sectional side view of a liquid spring suspension system having a resilient expandable pressure vessel surrounding a strut according to one embodiment of the present disclosure.

With reference now to FIG. 5, a liquid spring suspension system 300 according to one embodiment of the present disclosure includes a strut 301 in communication with a resilient expandable pressure vessel 302 surrounding the strut 301. As described in more detail below, the resilient expandable pressure vessel 302 may have any suitable size and configuration (e.g., number of layers, materials, thicknesses, and orientation of the fibers) depending on the desired expansion and expansivity of the resilient expandable pressure vessel 302 and the desired spring rate of the suspension system 300. For instance, the resilient expandable pressure vessel 302 may be similar to one of the resilient expandable pressure vessels 100, 200 described above with reference to FIGS. 1 and 3, except the resilient expandable pressure vessel 302 includes a pair of polar bosses 303, 304 on opposite ends of the resilient expandable pressure vessel 302. The polar bosses 303, 304 connect the resilient expandable pressure vessel 302 to opposite ends 305, 306 of the strut 301, respectively. In the illustrated embodiment, the polar bosses 303, 304 are integrally formed with the strut 301, although in one or more alternate embodiments, the polar bosses 303, 304 may be formed separately from the strut 301 and coupled to the strut 301 by any suitable means, such as, for instance, by a threaded coupling, mechanical fastening, welding, or any combination thereof.

With continued reference to the embodiment illustrated in FIG. 5, the strut 301 includes a cylinder 307 defining a chamber 308 filled with a volume of liquid 309. The strut 301 also includes a rod 310 and a piston 311 coupled to an upper end 312 of the rod 310. The rod 310 and the piston 311 are reciprocally movable within the chamber 308 of the cylinder 307. Additionally, the piston 311 divides the chamber 308 into an upper chamber portion 313 and a lower chamber portion 314. The piston 311 also includes control orifices and damping valving (not shown) connecting the upper chamber portion 313 to the lower chamber portion 314 such that under static conditions, the pressures in the upper and lower chamber portions 313, 314 are substantially equal. Suitable control orifices and damping valving is disclosed in U.S. Pat. No. 6,293,530, the entire content of which is incorporated herein by reference. The strut 301 also includes an upper mount 315 coupled to an upper end 316 of the cylinder 307. The strut 301 further includes a fitting 329 coupled to the upper end 316 of the cylinder 307 that allows the strut 301 to be hydraulically connected to other components of the suspension system 300. In one embodiment, the upper mount 315 is configured to attach the liquid spring suspension system 300 to a frame of a vehicle, although in one or more alternate embodiments, the upper mount 315 may be configured to attach the liquid spring suspension system 300 to any other desired structure. Furthermore, the strut 301 also includes a lower mount 317 coupled to a lower end 318 of the rod 310. The lower mounting 317 may be configured to attach the liquid spring suspension system 300 to any desired structure, such as, for instance, a wheel or axle assembly of a vehicle. Additionally, the strut 301 includes a gland 319 coupled to a lower end 320 of the cylinder 307 and configured to contain a volume of liquid 309 in the chamber 308. The gland 319 includes a central opening 321 through which the rod 310 extends out from the chamber 308. The gland 319 may also include one or more gaskets 322 (e.g., seals) within the central opening 321 configured to create a fluid-tight seal between the rod 310 and the gland 319.

In the illustrated embodiment of FIG. 5, the cylinder 307 also defines a pair of orifices 323, 324 configured such that the volume of liquid 309 in the chamber 308 is in communication with a volume of liquid 325 in a cavity 328 defined by the resilient expandable pressure vessel 302, the significance of which is described below. In an embodiment in which the upper mount 315 of the liquid spring suspension system 300 is coupled to a vehicle frame and the lower mount 317 is coupled to one wheel or axle assembly of the vehicle, the portion of the vehicle weight borne by one of the wheels or axle assemblies exerts a downward axial force on the cylinder 307, which tends to force the piston 311 and the rod 310 further into the chamber 308. This downward movement of the cylinder 307 progressively decreases the volume of the liquid 309 within the chamber 308 due to the increased space occupied by the rod 310 extending progressively further into the chamber 308.

The downward movement of the cylinder 307 also progressively increases the volume of the liquid 325 within the cavity 328 of the resilient expandable pressure vessel 302 because the chamber 308 of the cylinder 307 is in communication with the cavity 328 of the resilient expandable pressure vessel 302 via the orifices 323, 324 in the cylinder 307 (i.e., the downward movement of the cylinder 307 and the corresponding extension of the rod 310 and piston 311 further into the chamber 308 forces a displaced volume of liquid 309 in the chamber 308 through the orifices 323, 324 in the cylinder 307 and into the cavity 328 of the resilient expandable pressure vessel 302). The increased volume and pressure of the liquid 325 in the resilient expandable pressure vessel 302 forces the resilient expandable pressure vessel 302 to elastically expand until the pressure of the liquid 325 inside resilient expandable pressure vessel 302 is balanced by the elastic restorative force of the expanded pressure vessel 302 acting on the liquid 325. The energy stored in the expanded pressure vessel 302 and the compressed liquid 309, 325 exerts a progressively increasing net downward force on the rod 310 and the piston 311. When this net, downwardly directed force on the rod 310 and the piston 311 equals the portion of the vehicle weight borne by the wheel or axle assembly into which the liquid spring suspension system 300 is incorporated, the piston 311 will be at a vertical equilibrium point within the chamber 308. As a general proposition, the vertical equilibrium point of the piston 311 in the cylinder 307 establishes the "ride height" of the vehicle when it is at rest or traveling along essentially level terrain.

When an additional, upwardly directed "jounce" force is applied to the wheel or axle assembly, the rod 310 and the piston 311 are moved further into the chamber 308, thereby increasing the volume of liquid 325 in the cavity 328 of the resilient expandable pressure vessel 302, which causes the resilient expandable pressure vessel 302 to expand volumetrically (i.e., additional liquid 309 flows out of the chamber 308 through the orifices 323, 324 in the cylinder 307 and into the cavity 328 of the resilient expandable pressure vessel 302). When the upwardly directed jounce force on the wheel or axle assembly is reduced, such as when the wheel or axle assembly travels downwardly through the "rebound" portion of its overall wheel stroke, the energy stored within the expanded pressure vessel 302 and the compressed liquid 309, 325 tends to drive the piston 311 and the rod 310 downward relative to the cylinder 307. In this manner, the expansibility of the resilient expandable pressure vessel 302, in conjunction with the volume, pressure, and compressibility of the liquid 309, 325, provide the liquid spring suspension system 300 with the "spring" portion of its overall suspension action.

Additionally, as described above, in one or more embodiments, the expandable pressure vessel 302 may include one or more layers of resin-impregnated fibers. For instance, in one embodiment, the resilient expandable pressure vessel 302 may be the same as or similar to the resilient expandable pressure vessel 100 illustrated in FIG. 1, with characteristics shown in FIG. 2, or alternatively may be the same as or similar to the resilient expandable pressure vessel 200 illustrated in FIG. 3, with characteristics as shown in FIG. 4.

Depending on the application of the liquid spring suspension system 300, the resilient expandable pressure vessel 302 may be configured such that the transition points between the different spring rates (e.g., the transition points between regions A, B, and C in FIG. 4) correspond to different anticipated loads on the liquid spring suspension system 300. For instance, in an embodiment in which the liquid spring suspension system 300 is incorporated into a vehicle, the static pressure within the resilient expandable pressure vessel 302 is determined by the weight of the vehicle, which varies depending upon whether the vehicle is in an empty condition or a fully loaded condition. Accordingly, the resilient expandable pressure vessel 302 can be configured such that when the vehicle is in the empty condition, the pressure of the liquid 325 within the resilient expandable pressure vessel 302 remains within region B of FIG. 4 as the piston 311 and the rod 310 move between a fully extended position and a fully compressed position within the cylinder 307. The resilient expandable pressure vessel 302 may also be configured such that when the vehicle is in the fully loaded condition, the pressure of the liquid 325 in the resilient expandable pressure vessel 302 will fall within region B when the rod 310 and the piston 311 are in the fully extended position, but the pressure of the liquid 325 in the resilient expandable pressure vessel 302 may move into region C when the rod 310 and the piston 311 approach the fully compressed position in the cylinder 307, such as when a large magnitude "jounce" force is applied to the wheel or axle assembly. Accordingly, the higher spring rate associated with area C can be used to increase the spring rate of the liquid spring suspension system 300 when the rod 310 and the piston 311 are near the fully compressed position in the cylinder 307 to aid in preventing the suspension system 300 from reaching maximum compression, which would otherwise result in a large force being transmitted to the driver and the occupants of the vehicle. In this manner, the resilient expandable pressure vessel 302 functions as a load dependent variable rate spring (or jounce bumper).

Additionally, the greater the compressibility of the liquid 309, 325 in the chamber 308 and the cavity 328 of the resilient expandable pressure vessel 302, the lower the spring rate of the liquid spring suspension system 300. In one or more embodiments, the liquid 309, 325 in the chamber 308 and the cavity 328 of the resilient expandable pressure vessel 302 may be a compressible liquid, a non-compressible liquid, or combinations thereof (e.g., silicone oil, mineral oil, or combinations thereof).

Figure 6:
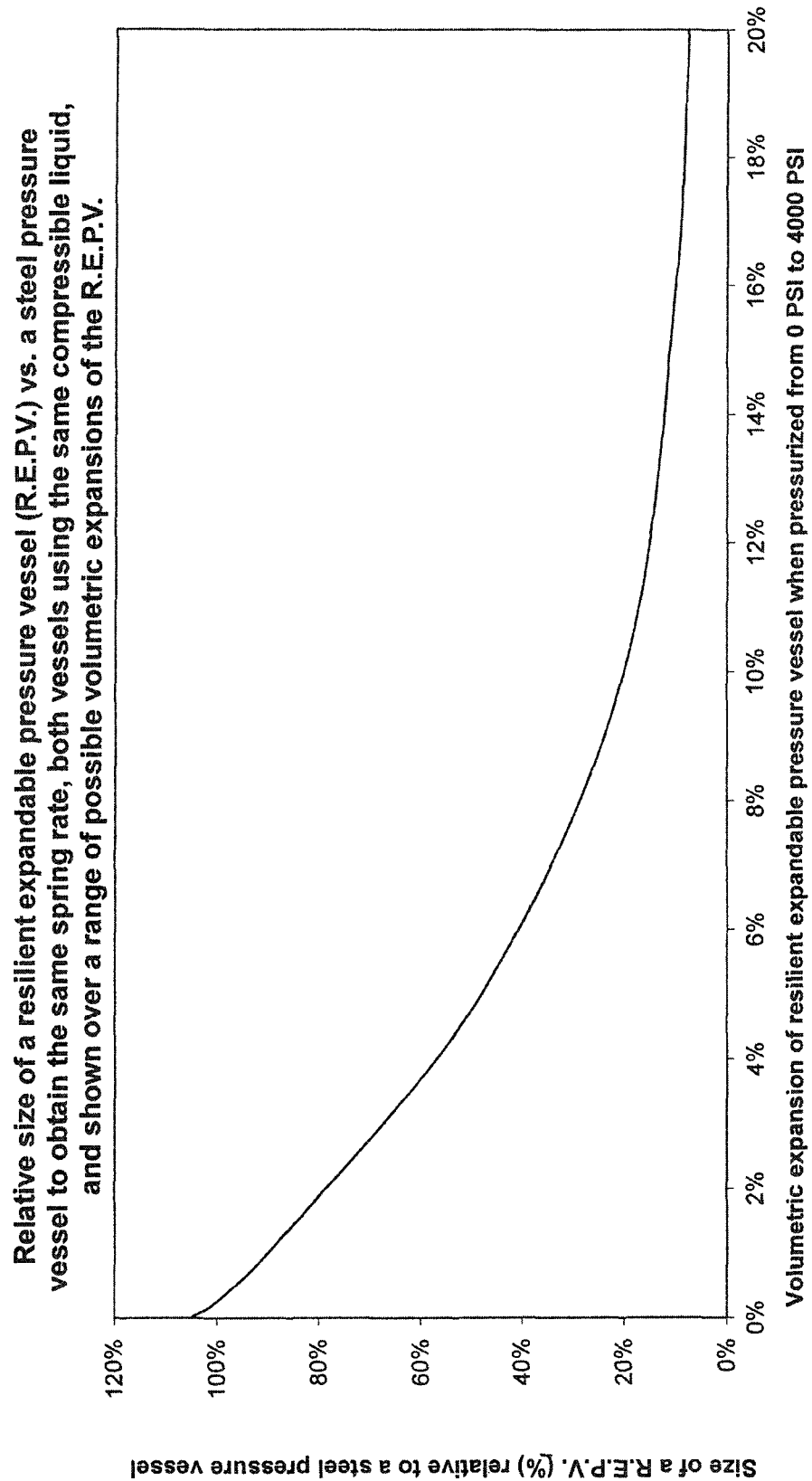
FIG. 6 is a graph illustrating the relative size of a resilient expandable pressure vessel of the present invention compared to a conventional non-expandable steel pressure vessel when designed to provide the same spring rate.

The behavior of the resilient expandable pressure vessel 302 facilitates the use of pressure vessels 302 that are smaller than conventional non-expandable pressure vessels while maintaining the predetermined spring rate of the liquid spring suspension system 300. FIG. 6 illustrates the relative volumetric size of a resilient expandable pressure vessel according to one embodiment of the present disclosure compared to a non-expandable conventional steel pressure vessel necessary to achieve the same spring rate when incorporated into a liquid spring suspension system using the same compressible liquid. As illustrated in FIG. 6, the resilient expandable pressure vessel according to one or more embodiments of the present disclosure may be smaller than the conventional steel pressure vessel and still produce the same spring rate when incorporated into a liquid spring suspension system. Moreover, a resilient expandable pressure vessel having a relatively higher degree of expansion may be smaller than a resilient expandable pressure vessel having a lower degree of expansion (i.e., the volumetric size of the resilient expandable pressure vessel necessary to produce a given spring rate decreases as the expansibility of the pressure vessel increases). For instance, as illustrated in FIG. 6, a resilient expandable pressure vessel having an expansion of approximately 2% when the liquid in the resilient expandable pressure vessel has a pressure of approximately 4000 psi needs to be only approximately 80% of the volume of a conventional steel pressure vessel in order to produce the same spring rate when the vessels are incorporated into a liquid spring suspension system. A resilient expandable pressure vessel having an expansion of approximately 12% at approximately 4000 psi needs to be only approximately 18% of the volume of a conventional steel pressure vessel in order to produce the same spring rate. Therefore, the expansibility of the resilient expandable pressure vessel 302 may be selected such that the size and spring rate of the resilient expandable pressure vessel 302 are suitable for the intended application of the liquid spring suspension system 300.

Figure 7:
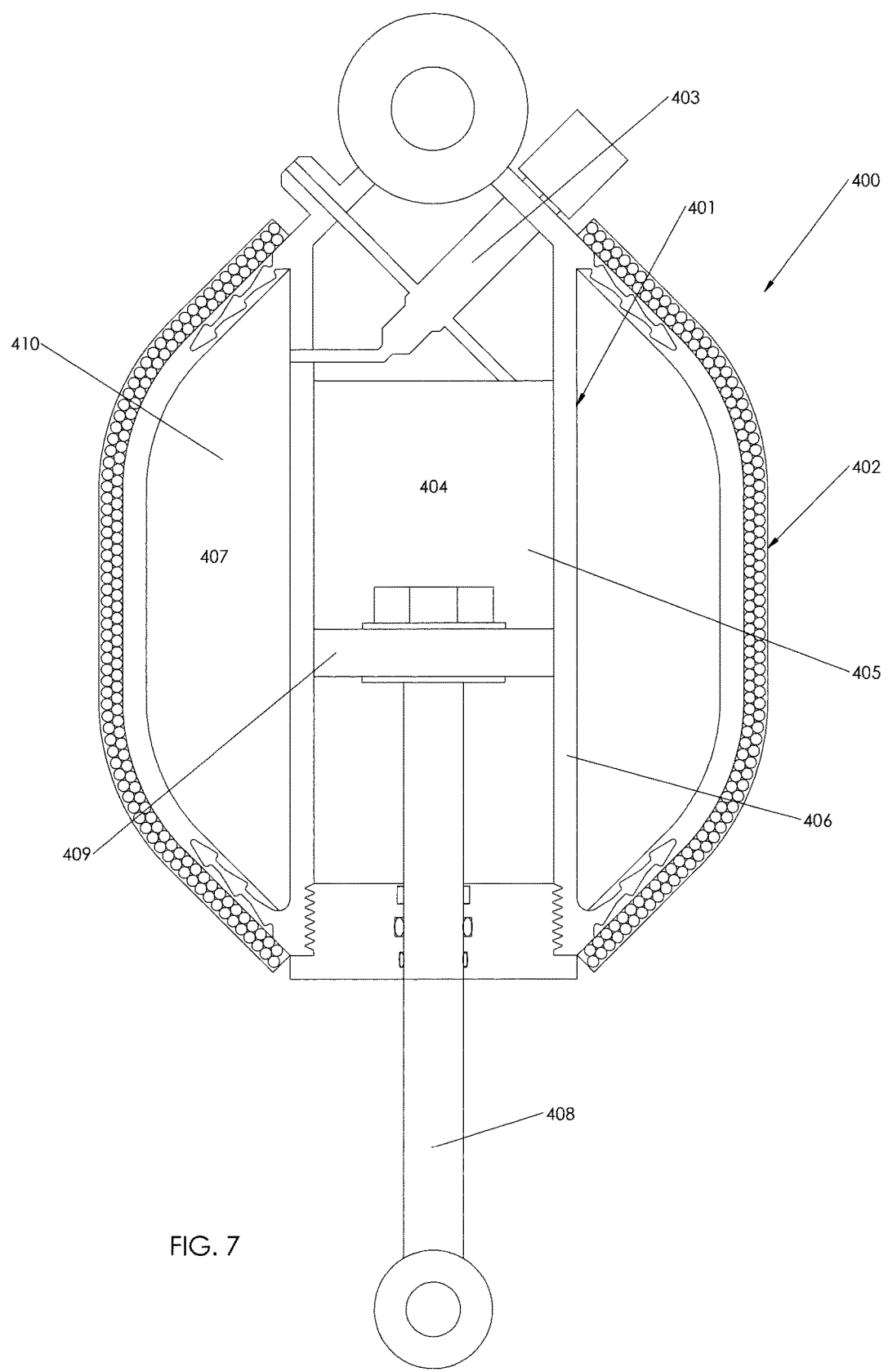
FIG. 7 is a cross-sectional side view of a liquid spring suspension system having a resilient expandable pressure vessel surrounding a strut according to another embodiment of the present disclosure.

With reference now to FIG. 7, a liquid spring suspension system 400 according to another embodiment of the present disclosure includes a strut 401 surrounded by a resilient expandable pressure vessel 402. The resilient expandable pressure vessel 402 may have any suitable size and configuration (e.g., number of layers, materials, thicknesses, and orientation of the fibers) depending on the desired spring rates of the suspension system 400. For instance, the resilient expandable pressure vessel 402 may be the same as or similar to the resilient expandable pressure vessel 302 described above with reference to FIG. 5. The strut 401 is similar to the strut 301 described above with reference to FIG. 5, except the orifices 323, 324 in the cylinder 307 are replaced by a manifold and valve assembly 403. The valve assembly 403 is selectively operable between an open position in which liquid 404 in a chamber 405 defined by a cylinder 406 of the strut 401 is in communication with liquid 407 in a cavity 410 defined by the resilient expandable pressure vessel 402 and a closed position in which the liquid 404 in the chamber 405 is isolated from the liquid 407 in the cavity 410 of the resilient expandable pressure vessel 402. When the valve 403 is actuated into the closed position, the spring rate of the liquid spring suspension system 400 is a function of the pressure, volume, and compressibility of the liquid 404 in the chamber 405. Accordingly, when the valve 403 is in the closed position and a rod 408 and a piston 409 are compressed into the cylinder 406, only the liquid 404 contained within the chamber 405 is compressed, which results in a relatively high spring rate. When the valve 403 is actuated into the open position such that the liquid 404 in the chamber 405 is in communication with the liquid 407 in the cavity 410 of the resilient expandable pressure vessel 402, the spring rate of the liquid spring suspension system 400 is a function of the combined pressure, volume, and compressibility of the liquid 404, 407 in the chamber 405 and the cavity 410 and the expansibility of the resilient expandable pressure vessel 402 such that the liquid spring suspension system 400 functions the same as, or similar to, the embodiment of the liquid spring suspension system 300 illustrated in FIG. 5. Accordingly, when the valve 403 is in the open position and the rod 408 and the piston 409 are compressed into the cylinder 406, the combined volume of liquid 404, 407 in the chamber 405 and the cavity 410 is compressed, a displaced volume of the liquid 404 in the chamber 405 flows into the cavity 410, and the increased volume and pressure of the fluid 407 in the cavity 410 forces the resilient expandable pressure vessel 402 to elastically expand, which results in a relatively low spring rate. Accordingly, the valve assembly 403 may be selectively actuated to switch between a relatively lower spring rate and a relatively higher spring rate of the liquid spring suspension system 400. In one or more embodiments, the liquid 404, 407 in the chamber 405 and the cavity 410 of the resilient expandable pressure vessel 402 may be a compressible liquid (e.g., silicone oil).

Figure 8:
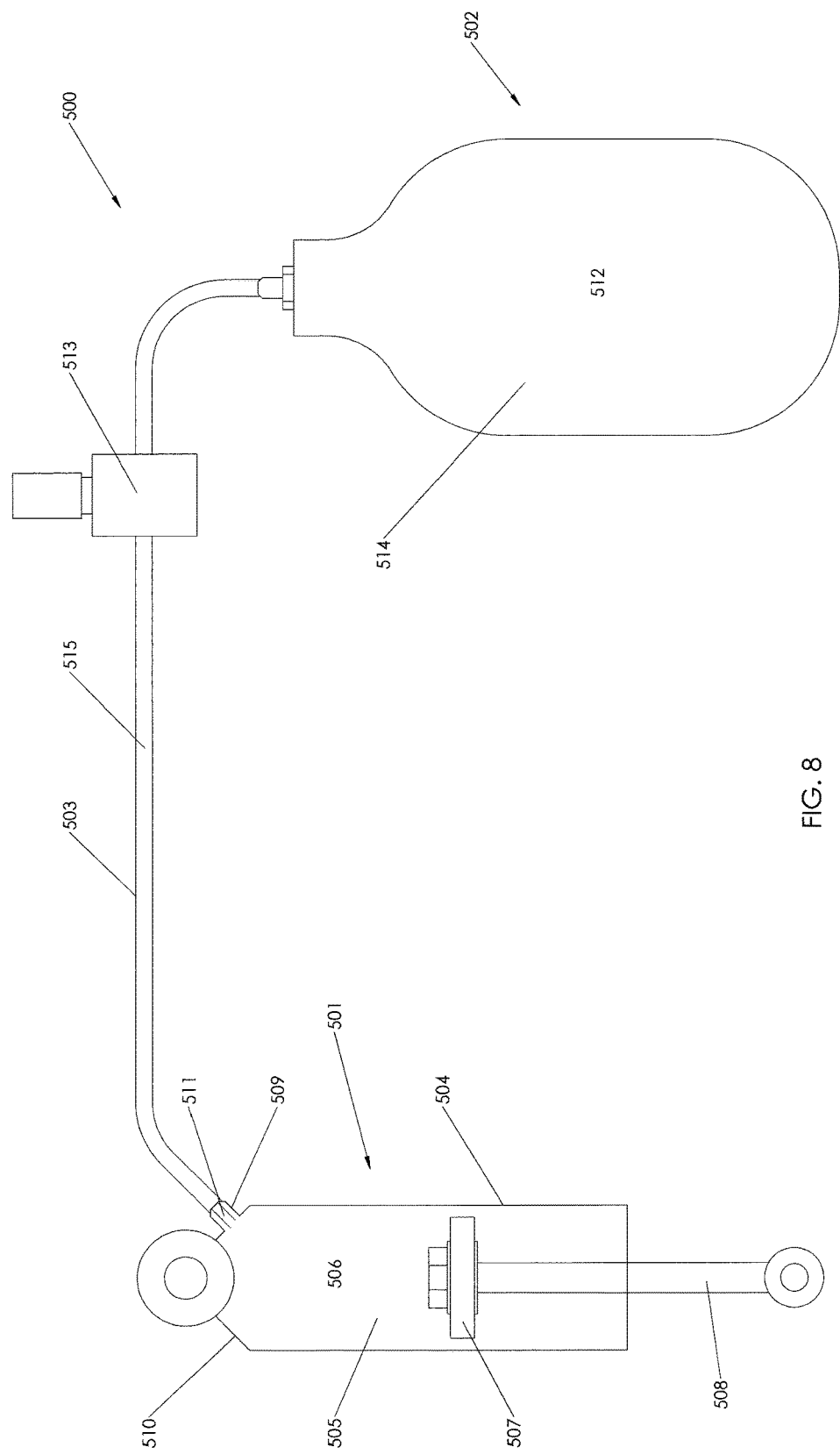
FIG. 8 is a schematic view of a liquid spring suspension system having a strut connected to a resilient expandable pressure vessel by a conduit according to one embodiment of the present disclosure.

With reference now to FIG. 8, a liquid spring suspension system 500 according to another embodiment of the present disclosure includes a strut 501 connected to a resilient expandable pressure vessel 502 via a conduit 503, such as a hose. The strut 501 includes a cylinder 504 defining a chamber 505 filled with a volume of liquid 506. The strut 501 also includes a piston 507 coupled to a rod 508 reciprocally movable within the chamber 505. The strut 501 may be the same as, or similar to, the strut 301 described above with reference to FIG. 5, except the cylinder 504 does not define a pair of orifices 323, 324 and the cylinder 504 does not include the bosses 303, 304. The strut 501 also includes a fitting 509 coupled to an upper end 510 of the cylinder 504. The fitting 509 includes a central opening 511 in communication with the chamber 505 of the cylinder 504. The conduit 503 is coupled to the fitting 509 such that the liquid 506 in the chamber 505 is in communication with liquid 512 in a cavity 514 of the resilient expandable pressure vessel 502. The conduit 503 also contains a volume of liquid 515. The resilient expandable pressure vessel 502 may have any suitable size and configuration (e.g., number of layers, materials, thickness, and orientation of the fibers) depending on the desired expansibility of the resilient expandable pressure vessel 502 and the desired spring rate of the suspension system 500. For instance, in one embodiment, the resilient expandable pressure vessel 502 may be the same as, or similar to, one of the resilient expandable pressure vessels 100, 200 described above with reference to FIGS. 1 and 3, and exhibit the same or similar characteristics as shown in FIGS. 2 and 4.

The liquid spring suspension system 500 also includes a manifold with a valve 513 coupled to the conduit 503 extending between the strut 501 and the resilient expandable pressure vessel 502. The valve 513 is selectively operable between an open position in which the liquid 506 in the chamber 505 is in communication with the liquid 512 in the cavity 514 of the resilient expandable pressure vessel 502 via the conduit 503 and a closed position in which the liquid 506 in the chamber 505 is isolated from the liquid 512 in the cavity 514 of the resilient expandable pressure vessel 502. When the valve 513 is actuated into the open position such that the liquid 506 in the chamber 505 is in communication with the liquid 512 in the cavity 514 of the resilient expandable pressure vessel 502, the spring rate of the liquid spring suspension system 500 is a function of the combined pressure, volume, and compressibility of liquid 506, 512, 515 in the chamber 505, the cavity 514 of the resilient expandable pressure vessel 502, and the conduit 503, respectively, and the expansion of the resilient expandable pressure vessel 502.

Accordingly, when the valve 513 is in the open position and the rod 508 and the piston 507 are compressed into the cylinder 504, the combined volume of liquid 506, 512, 515 in the chamber 505, the cavity 514 of the resilient expandable pressure vessel 502, and the conduit 503 is compressed and the resilient expandable pressure vessel 502 expands under the pressure of the liquid 512, resulting in a relatively low spring rate. When the valve 513 is actuated into the closed position such that liquid 506 in the chamber 505 is isolated from the liquid 512 in the cavity 514 of the resilient expandable pressure vessel 502, the spring rate of the liquid spring suspension system 500 is a function of the pressure, volume, and compressibility of the liquid 506, 515 in the chamber 505 and the portion of the conduit 503 extending between the strut 501 and the valve 513. Accordingly, when the valve 513 is in the closed position and the rod 508 and the piston 507 are compressed into the cylinder 504, only the volume of liquid 506, 515 in the chamber 505 and the portion of the conduit 503 extending between the strut 501 and the valve 513 is compressed, resulting in a relatively high spring rate of the liquid spring suspension system 500 (i.e., when the valve 513 is closed, only the liquid 506, 515 in the chamber 505 and the portion of the conduit 503 extending between the strut 501 and the valve 513 is compressed and neither the cylinder 504 nor the conduit 503 are configured to expand, and therefore the spring rate of the liquid spring suspension system 500 is relatively high compared to when the valve 513 is open and the combined volume of liquid 506, 512, 515 in the chamber 505, the cavity 514 of the resilient expandable pressure vessel 502, and the conduit 503 is compressed and the resilient expandable pressure vessel 502 expands). In one or more embodiments, the liquid 506, 512, 515 may be a compressible liquid (e.g., silicone oil).

Figure 9:
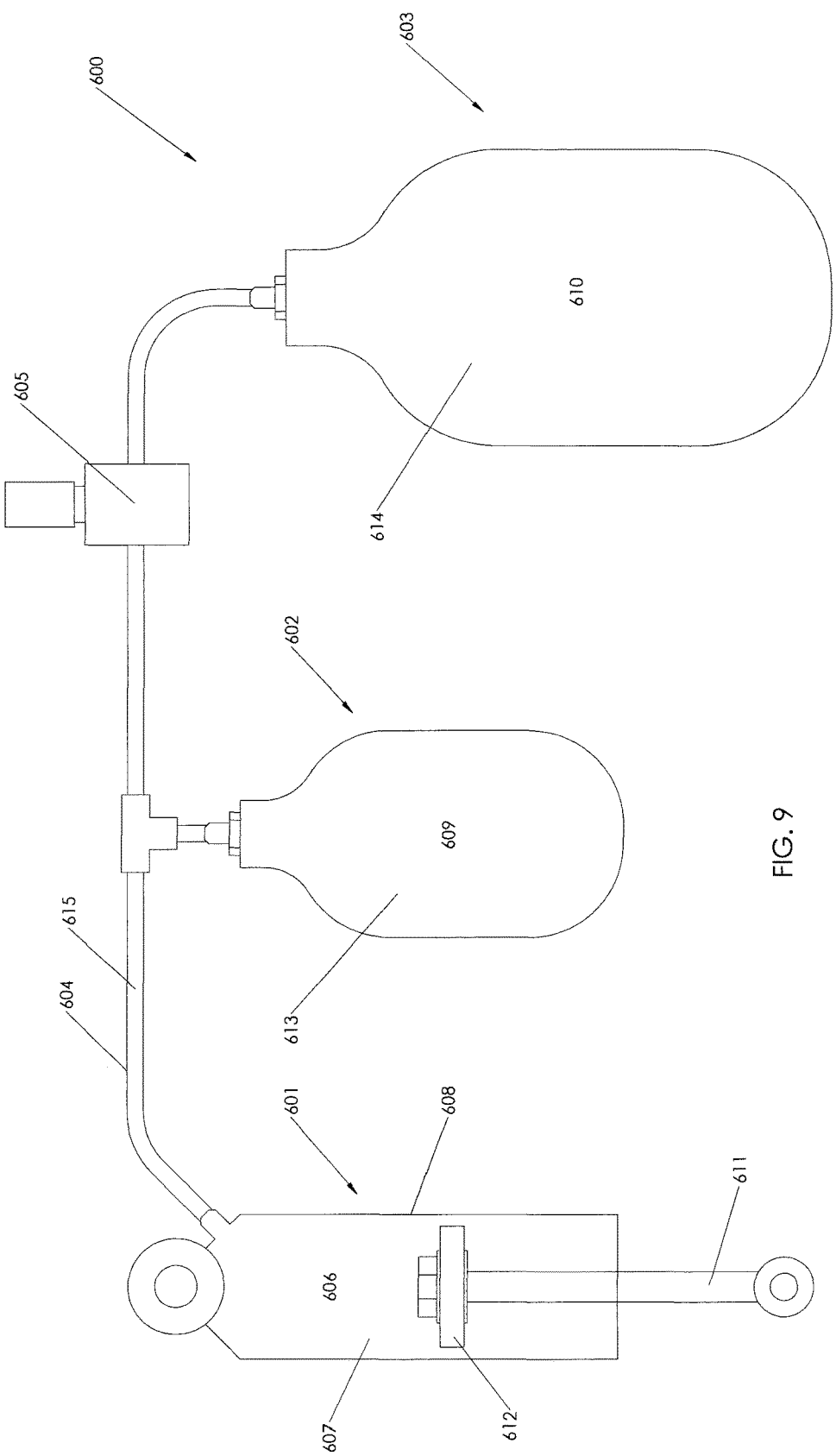
FIG. 9 is a schematic view of a liquid spring suspension system having a strut connected to a first and second resilient expandable pressure vessel by a conduit according to another embodiment of the present disclosure.

Referring to FIG. 9, a liquid spring suspension system 600 according to another embodiment of the present disclosure includes a strut 601 connected to first and second resilient expandable pressure vessels 602, 603, respectively, by a conduit 604, such as a hose. The strut 601 may be the same as or similar to the strut 501 illustrated in FIG. 8. The first and second resilient expandable pressure vessels 602, 603 may have any suitable size and configuration (e.g., number of layers, materials, thickness, and orientation of the fibers) depending on the desired expansibility of the resilient expandable pressure vessels 602, 603 and the desired spring rates of the suspension system 600. For instance, the first and second resilient expandable pressure vessels 602, 603 may be the same as or similar to one of the resilient expandable pressure vessels 100, 200 described above with reference to FIGS. 1 and 3, and exhibit the same or similar characteristics as shown in FIGS. 2 and 4. Additionally, although in one embodiment the first and second resilient expandable pressure vessels 602, 603 may have the same size and/or configuration, in one or more alternate embodiments, the first and second resilient expandable pressure vessels 602, 603 may have different sizes and/or configurations depending upon the desired spring rates of the liquid spring suspension system 600.

The liquid spring suspension system 600 also includes a manifold with a valve 605 coupled to the conduit 604. In the illustrated embodiment, the manifold with the valve 605 is located along a portion of the conduit 604 extending between the first and second resilient expandable pressure vessels 602, 603. The valve 605 is selectively operable between an open position in which a liquid 606 in a chamber 607 defined by a cylinder 608 of the strut 601 is in communication with a liquid 609 in a cavity 613 defined by the first resilient expandable pressure vessel 602 and a liquid 610 in a cavity 614 defined by the second resilient expandable pressure vessel 603 via the conduit 604 and a closed position in which the liquid 606 in the chamber 607 is isolated from the liquid 610 in the cavity 614 of the second resilient expandable pressure vessel 603. In the illustrated embodiment, the manifold with the valve 605 is positioned along the portion of the conduit 604 between the first and second resilient expandable pressure vessels 602, 603 such that the liquid 606 in the chamber 607 of the strut 601 remains in communication with the liquid 609 in the cavity 613 of the first resilient expandable pressure vessel 602 when the valve 605 is closed. The conduit 604 also includes a volume of liquid 615.

When the valve 605 is actuated into the open position such that the liquid 606 in the chamber 607 is in communication with both the first and second resilient expandable pressure vessels 602, 603, the spring rate of the liquid spring suspension system 600 is a function of the combined pressure, volume, and compressibility of liquid 606, 609, 610, 615 in the chamber 607, the cavities 613, 614 defined by the first and second resilient expandable pressure vessels 602, 603, and the conduit 604, and the expansibility of the first and second resilient expandable pressure vessels 602, 603. Accordingly, when the valve 605 is in the open position and the rod 611 and the piston 612 are compressed into the cylinder 608, the combined volume of the liquid 606, 609, 610, 615 in the chamber 607, the cavities 613, 614 defined by the first and second resilient expandable pressure vessels 602, 603, and the conduit 604 is compressed and the first and second resilient expandable pressure vessels 602, 603 elastically expand under the pressure of the combined volume of liquid, resulting in a relatively low spring rate. When the valve 605 is actuated into the closed position such that the liquid 606 in the chamber 607 is isolated from the second resilient expandable pressure vessel 603, the spring rate of the liquid spring suspension system 600 is a function of the volume and compressibility of the liquid 606, 609, 615 in the chamber 607, the cavity 613 of the first resilient expandable pressure vessel 602, and the portion of the conduit 604 extending between the strut 601, the valve 605, and the first resilient expandable pressure vessel 602, and the expansion of the first resilient expandable pressure vessel 602. Accordingly, when the valve 605 is in the closed position and the rod 611 and the piston 612 are compressed into the cylinder 608, the combined volume of liquid 606, 609, 615 in the chamber 607, the cavity 613 of the first resilient expandable pressure vessel 602, and the portion of the conduit 604 extending between the strut 601, the valve 605, and the first resilient expandable pressure vessel 602 is compressed and the first resilient expandable pressure vessel 602 elastically expands under the pressure of the liquid 609, resulting in a relatively higher spring rate (i.e., when the valve 605 is closed, only the first resilient expandable pressure vessel 602 expands, and therefore the spring rate of the liquid spring suspension system 600 is relatively high compared to when the valve 605 is open and both the first and second resilient expandable pressure vessels 602, 603 elastically expand).

As described above, when the valve 605 is closed, the spring rate of the liquid spring suspension system 600 depends on the pressure, volume, and compressibility of the liquid 606, 609, 615 in the chamber 607, the cavity 613 of the first resilient expandable pressure vessel 602, and the portion of the conduit 604 extending between the strut 601, the valve 605, and the first resilient expandable pressure vessel 602, as well as the expansibility of the first resilient expandable pressure vessel 602. In one or more embodiments, the liquid 606, 609, 610, 615 may be a compressible liquid, a non-compressible liquid, or combinations thereof (e.g., silicone oil, mineral oil, or combinations thereof).

Although in the illustrated embodiment the liquid spring suspension system 600 includes two resilient expandable pressure vessels 602, 603, in one or more alternate embodiments, the liquid spring suspension system 600 may include any other number of resilient expandable pressure vessels, such as, for instance, from three to six resilient expandable pressure vessels, depending upon the desired number of potential different spring rates of the liquid spring suspension system 600. Additionally, although in the illustrated embodiment the liquid spring suspension system includes one valve 605, in one or more alternate embodiments, the liquid spring suspension system 600 may include any other suitable number of valves. For instance, in one embodiment, the liquid spring suspension system 600 may include a plurality of valves equal in number to the number of resilient expandable pressure vessels such that each resilient expandable pressure vessel can be independently placed into communication with the chamber 607 of the strut 601 or isolated from the chamber 607 by actuating the valve associated with that particular resilient expandable pressure vessel.

Figure 10:
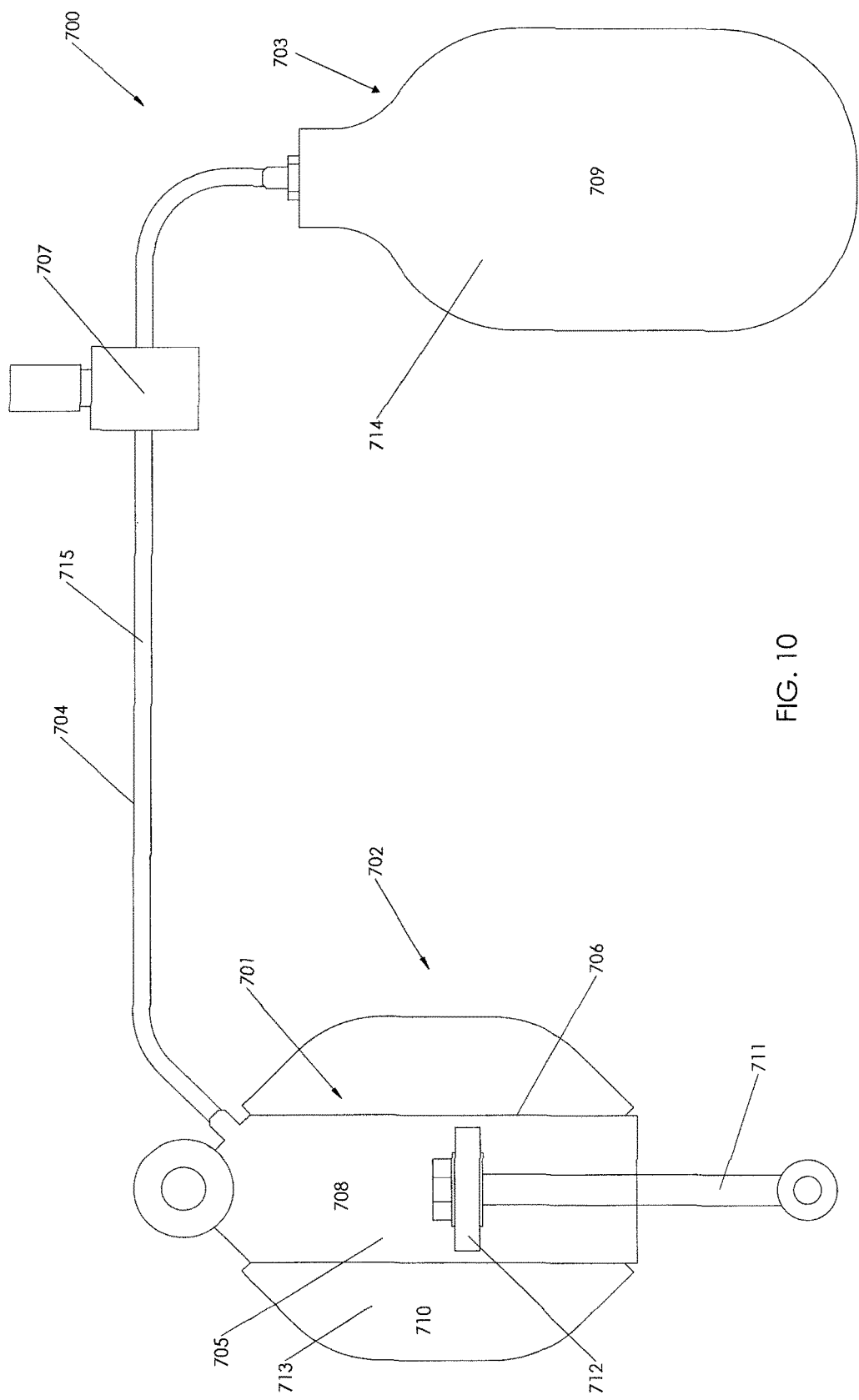
FIG. 10 is a schematic view of a liquid spring suspension system having a strut surrounded by a first resilient expandable pressure vessel and connected to a second resilient expandable pressure vessel by a conduit according to a further embodiment of the present disclosure.

With reference now to FIG. 10, a liquid spring suspension system 700 according to a further embodiment of the present disclosure includes a strut 701, a first resilient expandable pressure vessel 702 surrounding the strut 701, and a second resilient expandable pressure vessel 703 connected via a conduit 704 (e.g., a hose) to the strut 701. The first and second resilient expandable pressure vessels 702, 703 may have any suitable size and configuration (e.g., number of layers, materials, thickness, and orientation of the fibers) depending on the desired expansibility of the resilient expandable pressure vessels 702, 703 and the desired spring rates of the suspension system 700. In one embodiment, the strut 701 and the first resilient expandable pressure vessel 702 surrounding the strut 701 may be the same as or similar to one of the struts 301, 401 and resilient expandable pressure vessels 302, 402 described above with reference to FIG. 5 or 7. For instance, a cavity 713 defined by the first resilient expandable pressure vessel 702 surrounding the strut 701 may be in communication with a chamber 705 via orifices in a cylinder 706 or the cavity 713 of the first resilient expandable pressure vessel 702 may be selectively isolated or placed in communication with the chamber 705 via a valve. Additionally, in one embodiment, the second resilient expandable pressure vessel 703 may be the same as or similar to one of the resilient expandable pressure vessels 100, 200 described above with reference to FIGS. 1 and 3, and may have the same or similar characteristics as shown in FIGS. 2 and 4.

The liquid spring suspension system 700 also includes a manifold with a valve 707 coupled to the conduit 704. The valve 707 is selectively operable between an open position in which a liquid 708 in the chamber 705 of the strut 701 is in communication with a liquid 709 in a cavity 714 defined by the second resilient expandable pressure vessel 703 via the conduit 704 and a closed position in which the liquid 708 in the chamber 705 is isolated from the liquid 709 in cavity 714 of the second resilient expandable pressure vessel 703. The conduit 704 also contains a volume of liquid 715.

When the valve 707 is actuated into the open position, and either the valve separating the chamber 705 from the cavity 713 of the first resilient expandable pressure vessel 702 surrounding the strut 701 is in the open position or the cylinder 706 defines a pair of orifices maintaining the chamber 705 in communication with a liquid 710 in the cavity 713 of the first resilient expandable pressure vessel 702, the liquid 708 in the chamber 705 is in communication with both the first and second resilient expandable pressure vessels 702, 703. Thus, when the valve 707 is in the open position, the spring rate of the liquid spring suspension system 700 is a function of the combined pressure, volume, and compressibility of liquid 708, 709, 710, 715 in the chamber 705, the cavities 713 and 714 of the first and second resilient expandable pressure vessels 702, 703, and the conduit 704, respectively, and the expansibility of the first and second resilient expandable pressure vessels 702, 703. Accordingly, when the valve 707 is in the open position and the rod 711 and the piston 712 are compressed into the cylinder 706, the combined volume of liquid 708, 709, 710, 715 in the chamber 705, the cavities 713 and 714 of the first and second resilient expandable pressure vessels 702, 703, and the conduit 704, respectively, is compressed and the first and second resilient expandable pressure vessels 702, 703 expand under the pressure of the liquid 710, 709, resulting in a relatively low spring rate.

When the valve 707 is actuated into the closed position, and either the valve connecting the chamber 705 to the cavity 713 of the first resilient expandable pressure vessel 702 surrounding the strut 701 is in the open position or the cylinder 706 defines a pair of orifices maintaining the chamber 705 in communication with the liquid 710 in the cavity 713 of the first resilient expandable pressure vessel 702, the liquid 708 in the chamber 705 is isolated from the second resilient expandable pressure vessel 703 but remains in communication with the liquid 710 in the cavity 713 of the first resilient expandable pressure vessel 702 surrounding the strut 701. Thus, in this operating condition, the spring rate of the liquid spring suspension system 700 is a function of the pressure, volume, and compressibility of the liquid 708, 710, 715 in the chamber 705, the cavity 713 of the first resilient expandable pressure vessel 702, and the portion of the conduit 704 extending between the strut 701 and the valve 707, respectively, and the expansibility of the first resilient expandable pressure vessel 702. Accordingly, when only the valve 707 is in the closed position and the rod 711 and the piston 712 are compressed into the cylinder 706, the combined volume of liquid 708, 710, 715 in the chamber 705, the cavity 713 of the first resilient expandable pressure vessel 702, and the portion of the conduit 704 extending between the strut 701 and the valve 707 is compressed and the first resilient expandable pressure vessel 702 expands under the pressure of the liquid 710, resulting in a relatively higher spring rate (i.e., when only the valve 707 is closed, only the first resilient expandable pressure vessel 702 expands, and therefore the spring rate of the liquid spring suspension system 700 is relatively higher compared to when the valve 707 is open and both the first and second resilient expandable pressure vessels 702, 703 expand). In an embodiment in which there is a valve connecting the chamber 705 to the cavity 713 of the first resilient expandable pressure vessel 702 and when both this valve and the valve 707 are in the closed position such that liquid 708 in the chamber 705 is isolated from both the first and second resilient expandable pressure vessels 702, 703, the spring rate of the liquid spring suspension system 700 is a function of the pressure, volume, and compressibility of the liquid 708, 715 in the chamber 705 and in the portion of the conduit 704 extending between the strut 701 and the valve 707. Accordingly, when both valves are in the closed position and the rod 711 and the piston 712 are compressed into the cylinder 706, only the volume of liquid 708, 715 in the chamber 705 and in the portion of the liquid conduit 704 extending between the strut 701 and the valve 707 is compressed and neither the cylinder 706 nor the conduit 704 are configured to expand, resulting in an even higher spring rate. In one or more embodiments, the liquid 708, 713, 715, 714 may be a compressible liquid, a non-compressible liquid, or combinations thereof (e.g., silicone oil, mineral oil, or combinations thereof).

Figure 11:
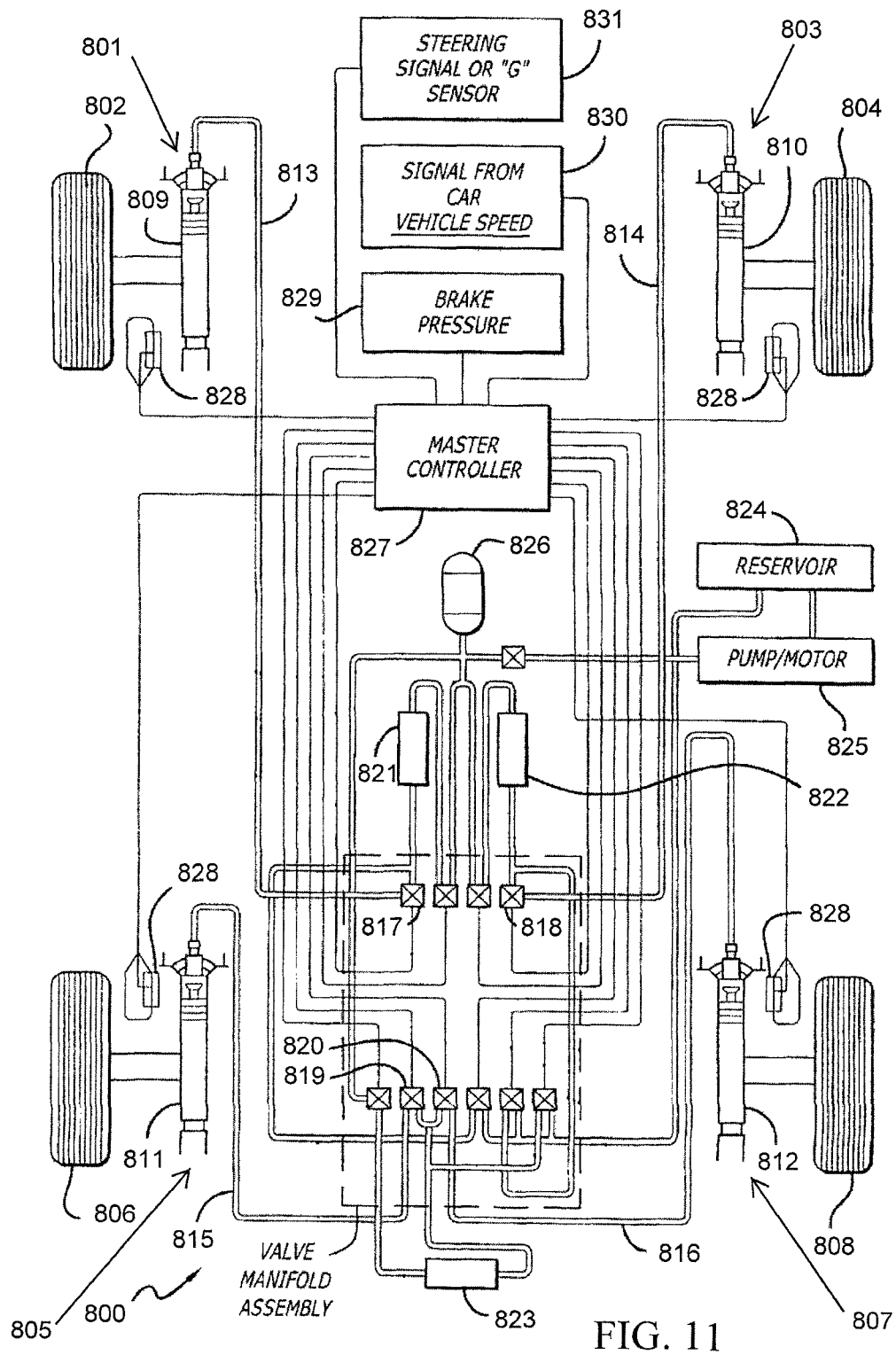
FIG. 11 is a schematic view of a vehicular suspension system according to one embodiment of the present disclosure that includes an accumulator.

As described above, the liquid spring suspension systems 300, 400, 500, 600, 700 of the present disclosure may be incorporated into any desired structure to absorb forces and dampen vibrations which might otherwise damage the structure. For instance, FIG. 11 is a schematic illustration of a vehicular suspension system 800 having a left front liquid spring suspension system 801 coupled to a left front wheel 802, a right front liquid spring suspension system 803 coupled to a right front wheel 804, a left rear liquid spring suspension system 805 coupled to a left rear wheel 806, and a right rear liquid spring suspension system 807 coupled to a right rear wheel 808. In the illustrated embodiment, each of the liquid spring suspension systems 801, 803, 805, 807 includes a strut 809, 810, 811, 812 connected via a hose 813, 814, 815, 816 and a valve 817, 818, 819, 820 to a resilient expandable pressure vessel 821, 822, 823. In the illustrated embodiment, the left and right rear liquid spring suspension systems 805, 807 are connected to a single resilient expandable pressure vessel 823, although in one or more alternate embodiments, the left and right rear liquid spring suspension systems 805, 807 may be connected to separate resilient expandable pressure vessels. In one embodiment, the liquid spring suspension systems 801, 803, 805, 807 may be the same as or similar to one of the liquid spring suspension systems 500, 600, 700 described above with reference to FIGS. 8, 9, and 10. In one or more alternate embodiments, the liquid spring suspension systems 801, 803, 805, 807 may have any other suitable configuration. For instance, the liquid spring suspension systems 801, 803, 805, 807 of the vehicular suspension system 800 may be the same as or similar to one of the liquid spring suspension systems 300, 400 described above with reference to FIGS. 5 and 7.

With continued reference to FIG. 11, the vehicular suspension system 800 also includes a liquid reservoir 824 for collecting and storing excess liquid in the system. This excess liquid may be utilized by a pump/motor 825 to charge an accumulator 826 to a predetermined pressure. In one embodiment, the accumulator 826 may be a conventional accumulator including a cylinder defining a chamber separated into two sub-chambers by a floating piston, an elastic diaphragm, a bladder, or metal bellows. One of the sub-chambers of the accumulator 826 contains a liquid and the other sub-chamber is pressurized with a gas (e.g., nitrogen) or by a spring (e.g., a coil spring). The pressurized gas or spring applies a force to the liquid in the other sub-chamber in order to smooth out pressure fluctuations in the vehicular suspension system 800 caused by the pump 825, supply an extra volume of liquid to the resilient expandable pressure vessels 821, 822, 823 of the liquid spring suspension systems 801, 803, 805, 807, and maintain the pressure of the vehicular suspension system 800 within a certain range without the pump 825 having to cycle on and off repeatedly. In one or more alternate embodiments, the accumulator 826 may be the same as or similar to one of the resilient expandable pressure vessels 100, 200 described above with reference to FIGS. 1 and 3 and exhibit the same or similar characteristics as shown in FIGS. 2 and 4. Using a resilient expandable pressure vessel 100, 200 as an accumulator is less complex and less costly than a standard accumulator because the resilient expandable pressure vessel 100, 200 does not include a floating piston, an elastic diaphragm, a bladder, metal bellows, or any other structure dividing the pressure vessel into two separate chambers (e.g., a hydraulic fluid chamber and a pressurized gas chamber). Instead, the resilient expandable pressure vessel 100, 200 contains a single chamber filled with a liquid and the expansion of the resilient expandable pressure vessel 100, 200 supplies the force (or the spring) on the liquid, rather than a pressurized gas or a coil spring. Accordingly, using a resilient expandable pressure vessel 100, 200 as an accumulator may be more reliable and durable than a standard accumulator because floating pistons, elastic diaphragms, bladders, and metal bellows are all prone to leakage and failure. Valves, or other means, may be operated such that excess liquid may be removed from one or more of the resilient expandable pressure vessels 821, 822, 823 and deposited in the reservoir 824. Additionally, using a resilient expandable pressure vessel 100, 200 as an accumulator may mitigate the generation of noise, such as due to hydraulic hammering.

With continued reference to the embodiment illustrated in FIG. 11, the vehicular suspension system 800 may also include a master controller 827, such as, for instance, a digital microprocessor or an analog control system. In one embodiment, the master controller 827 is configured to receive input signals from height sensors 828 connected to the wheels 802, 804, 806, 808 of the vehicular suspension system 800, a brake pressure sensor 829, a speed sensor 830, and a steering sensor or a lateral "g" sensor 831 (e.g., an accelerometer). Based upon the signal inputs received from these sensors 828, 829, 830, 831, the master controller 827 is configured to change the performance characteristics of the vehicular suspension system 800 by opening and/or closing one or more of the valves 817, 818, 819, 820 to change the spring rates of the liquid spring suspension systems 801, 803, 805, 807. Methods of using the master controller 827 to modify the performance characteristics of the vehicular suspension system 800 to compensate for a variety of different conditions detected by the sensors 828, 829, 830, 831, such as, for instance, the relative displacement between the vehicle frame and the wheel support assemblies, the speed of the vehicle, the applied brake pressure, and the turning motion of the vehicle are described in U.S. Pat. No. 6,293,530, the entire contents of which are incorporated herein by reference. Additionally, in one or more embodiments, the vehicular suspension system 800 may incorporate a variety of different control schemes, such as pulse width modulation control, to vary the characteristics of the vehicular suspension system 800 to respond to changing conditions. Suitable pulse width modulation control schemes are described in U.S. Pat. No. 6,679,504, the entire contents of which are incorporated herein by reference.

Although the accumulator 826 is described above with reference to a vehicular suspension system, in one or more embodiments, the resilient expandable pressure vessels of the present disclosure may be used as an accumulator in any other suitable application (e.g., the resilient expandable pressure vessels of the present disclosure may be configured to function as any general accumulator).

Additionally, the resilient expandable pressure vessels of the present disclosure may be used or incorporated into an air suspension system. Many conventional air suspension systems contain a main reservoir, or pressure vessel, where air under pressure is stored in order to provide a source of pressurized air to the air springs to assist in rapidly raising the vehicle to ride height from a kneeled or lowered position. Some air suspensions also contain auxiliary pressure vessels (sometimes known as ping tanks) that are individually connected to an air spring in order to lower the spring rate of the air springs. Both of these uses of pressure vessels in an air suspension are shown in U.S. Pat. No. 7,416,190, the entire contents of which are incorporated herein by reference. Often the available packaging space for these pressure vessels is limited and therefore the performance of the air suspension suffers since optimally sized pressure vessels cannot be used. Replacing the conventional auxiliary pressure vessel (i.e., the conventional ping tank) with an embodiment of the resilient expandable pressure vessel of the present disclosure may improve performance of the air suspension system while still utilizing the same packaging space or may achieve the same or substantially the same performance as the conventional auxiliary pressure vessel while occupying a smaller packaging space.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is referred to as being "coupled" or "connected" to another component, it can be directly attached to the other component or intervening components may be present therebetween.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

What is claimed is:

1. A resilient expandable pressure vessel, comprising:
   a body portion;
   a cavity defined within the body portion; and
   at least one port in communication with the cavity defined in the body portion, the at least one port configured to receive a fluid into the cavity and discharge the fluid from the cavity,
   wherein the resilient expandable pressure vessel has a predetermined, nonlinear expansibility that decreases across a range of operating pressures of the fluid in the cavity, the range being at least 200 psi.

2. The resilient expandable pressure vessel of claim 1, wherein the resilient expandable pressure vessel has an expansion greater than approximately 0.1% when an operating pressure of the fluid in the cavity is approximately 500 psi.

3. The resilient expandable pressure vessel of claim 1, wherein the resilient expandable pressure vessel has an expansion less than approximately 200% when an operating pressure of the fluid in the cavity is greater than approximately 5000 psi.

4. The resilient expandable pressure vessel of claim 1, wherein the predetermined, nonlinear expansibility of the resilient expandable pressure vessel decreases continually across the range of operating pressures of the fluid in the cavity.

5. An accumulator comprising the resilient expandable pressure vessel of claim 1.

6. The resilient expandable pressure vessel of claim 1, wherein the range is at least 500 psi.

7. The resilient expandable pressure vessel of claim 1, wherein the range is at least 1000 psi.

8. A suspension system, comprising:
   a cylinder defining a chamber;
   at least one of a piston and a rod reciprocally movable within the chamber;
   a resilient expandable pressure vessel defining a cavity in communication with the chamber; and
   a fluid contained within the chamber and the cavity,
   wherein the resilient expandable pressure vessel has a predetermined, nonlinear expansibility that decreases across a range of operating pressures of the fluid in the suspension system, the range being at least 200 psi.

9. The suspension system of claim 8, wherein the resilient expandable pressure vessel has an expansion greater than approximately 0.1% when an operating pressure of the fluid in the resilient expandable pressure vessel is approximately 500 psi.

10. The suspension system of claim 8, wherein the resilient expandable pressure vessel has an expansion less than approximately 200% when an operating pressure of the fluid in the resilient expandable pressure vessel is greater than approximately 5000 psi.

11. The suspension system of claim 8, wherein the fluid is a liquid.

12. The suspension system of claim 11, wherein the liquid is a compressible liquid.

13. The suspension system of claim 11, wherein the liquid is a non-compressible liquid.

14. The suspension system of claim 8, wherein the resilient expandable pressure vessel surrounds the cylinder.

15. The suspension system of claim 14, wherein the cylinder defines at least one orifice placing the chamber directly in communication with the cavity.

16. The suspension system of claim 14, further comprising a manifold and valve assembly coupled to the cylinder, wherein the manifold and valve assembly is selectively operable between an open position in which the chamber is in communication with the cavity and a closed position in which the chamber is isolated from the cavity.

17. The suspension system of claim 8, wherein the resilient expandable vessel is separated from the cylinder.

18. The suspension system of claim 8, further comprising a valve located between the chamber and the resilient expandable pressure vessel, wherein the valve is selectively operable between an open position in which the chamber is in communication with the cavity and a closed position in which the chamber is isolated from the cavity.

19. The suspension system of claim 8, further comprising a second resilient expandable pressure vessel defining a second cavity in communication with the chamber.

20. The suspension system of claim 19, further comprising a valve located between the chamber and the second resilient expandable pressure vessel, wherein the valve is selectively operable between an open position in which the chamber is in communication with the second cavity and a closed position in which the chamber is isolated from the second cavity.

21. The suspension system of claim 8, wherein the predetermined, nonlinear expansibility of the resilient expandable pressure vessel decreases continually across the range of operating pressures of the fluid in the cavity.

* * * * *